(12) United States Patent
Rieth

(10) Patent No.: US 12,515,298 B2
(45) Date of Patent: Jan. 6, 2026

(54) GRINDING AND/OR CUTTING TOOL AND METHOD FOR GRINDING AND/OR CUTTING

(71) Applicant: GERIMA HOLDING GMBH, St. Wendel (DE)

(72) Inventor: Stephan Rieth, St. Wendel (DE)

(73) Assignee: GERIMA HOLDING GMBH, St. Wendel (DE)

(*) Notice: Subject to any disclaimer, the term of this patent is extended or adjusted under 35 U.S.C. 154(b) by 319 days.

(21) Appl. No.: 16/647,812

(22) PCT Filed: Sep. 26, 2018

(86) PCT No.: PCT/DE2018/100814
§ 371 (c)(1),
(2) Date: Mar. 16, 2020

(87) PCT Pub. No.: WO2019/063044
PCT Pub. Date: Apr. 4, 2019

(65) Prior Publication Data
US 2020/0269389 A1 Aug. 27, 2020

(30) Foreign Application Priority Data

Sep. 26, 2017 (DE) ...................... 10 2017 122 331.2

(51) Int. Cl.
*B24D 5/12* (2006.01)
*B24D 7/14* (2006.01)

(52) U.S. Cl.
CPC .................... *B24D 5/12* (2013.01); *B24D 7/14* (2013.01)

(58) Field of Classification Search
CPC . B24D 5/12; B24D 5/13; B24D 7/005; B24D 7/06; B24D 7/08; B24D 7/18; B24D 7/00; B26D 61/02; B26D 61/026

(Continued)

(56) References Cited

U.S. PATENT DOCUMENTS 4,267,814 A * 5/1981 Benson ................. B28D 1/121
125/15
4,407,263 A * 10/1983 Murata ................. B28D 1/127
451/541

(Continued)

FOREIGN PATENT DOCUMENTS

CN 203471060 * 3/2014
CN 203471060 U * 3/2014

(Continued)

OTHER PUBLICATIONS

Machine Translation CN203471060 (Year: 2014).*

*Primary Examiner* — C. A. Rivera
(74) *Attorney, Agent, or Firm* — LUCAS & MERCANTI, LLP; Klaus P. Stoffel

(57) ABSTRACT

A grinding and/or cutting tool which has at least one surface region for a lateral grinding process and a surface region for a circumferential grinding process and/or a cutting process. The surface regions have different removal properties. The material properties of the surface regions differ in that the surface regions have different abrasive materials, grinding particle shapes, particle scattering patterns, particle sizes, degrees of hardness, structures, and/or binders. In one embodiment, the grinding and/or cutting tool has two of the surface regions for a lateral grinding process, and the two surface regions for a lateral grinding process are arranged at a distance from one another. The surface region for a circumferential grinding process or for a cutting process is arranged preferably between the two surface regions for a lateral grinding process.

12 Claims, 14 Drawing Sheets

(58) Field of Classification Search
USPC .......................... 451/28, 533, 544, 546–548
See application file for complete search history.

(56) References Cited

U.S. PATENT DOCUMENTS

| | | | | |
|---|---|---|---|---|
| 4,562,670 A * | 1/1986 | Maier | ................. | B23Q 1/4804 |
| | | | | 451/340 |
| 5,249,566 A * | 10/1993 | Sawluk | ................. | B28D 1/121 |
| | | | | 451/542 |
| 5,496,209 A * | 3/1996 | Gaebe | ................. | B24B 3/36 |
| | | | | 451/548 |
| 5,529,528 A * | 6/1996 | Young | ................. | B23D 61/026 |
| | | | | 83/837 |
| 5,704,828 A * | 1/1998 | Young | ................. | B23D 61/026 |
| | | | | 83/837 |
| 6,280,309 B1 * | 8/2001 | Van Osenbruggen | ..................... | |
| | | | | B24D 13/20 |
| | | | | 451/550 |
| 6,595,845 B1 * | 7/2003 | Mizuno | ................. | B28D 1/041 |
| | | | | 125/15 |
| 6,632,131 B1 * | 10/2003 | Buchholz | ............ | B23D 61/026 |
| | | | | 451/550 |
| 2004/0226429 A1 | 11/2004 | Voigt | | |
| 2014/0256238 A1 * | 9/2014 | Van | ......................... | B24D 5/14 |
| | | | | 451/548 |

FOREIGN PATENT DOCUMENTS

| | | |
|---|---|---|
| DE | 29920124 U1 | 3/2001 |
| DE | 10321629 A1 | 12/2004 |
| DE | 202006001154 U1 | 3/2007 |
| DE | 202008008103 U1 | 9/2008 |
| DE | 102009030484 A1 | 12/2010 |
| JP | H059861 U | 2/1993 |
| WO | 9941040 A1 | 8/1999 |
| WO | WO-0038883 A1 * | 7/2000 ............... B24D 7/16 |
| WO | WO-0136160 A2 * | 5/2001 ............. B24D 13/16 |

* cited by examiner

GRINDING AND/OR CUTTING TOOL AND METHOD FOR GRINDING AND/OR CUTTING

The present application is a 371 of International application PCT/DE2018/100814, filed Sep. 26, 2018, which claims priority of DE 10 2017 122 331.2, filed Sep. 26, 2017, the priority of these applications is hereby claimed and these applications are incorporated herein by reference.

BACKGROUND OF THE INVENTION

Grinding disks, roughing disks and cutting disks are known from use. The grinding disks are used in various applications such as circumferential grinding, face grinding, external cylindrical grinding or internal cylindrical grinding. The roughing disks are provided for obtaining relatively coarse removal of material. In contrast to the grinding disks and roughing disks, the cutting disks are not used for planar removal of material from a workpiece but instead serve to cut a workpiece along a line.

SUMMARY OF THE INVENTION

The object of the invention is to make available a grinding and/or cutting tool that can be used more flexibly than the known tools.

According to the invention, this object is achieved by the fact that the surface region for face grinding and the surface region for circumferential grinding and/or cutting have removal properties differing from one another.

On the one hand, it is advantageously possible for the removal properties of the respective surface region to be adapted according to the load intended for the grinding and/or cutting tool and, on the other hand, a combination tool is created that is able to be used flexibly in different functions.

The removal properties can be provided, for example, in such a way that they achieve different effects in the machining of a workpiece, e.g. roughing, precision grinding or cutting, or have different lifetimes or can withstand different mechanical loads. It is expedient, for example, to provide the removal properties of the different surface regions with different lifetimes if it is anticipated that the different surface regions are to be used for different lengths of time or under different loads. For example, if the two surface regions are used with the same effect, for example for precision grinding, but approximately 80% of the grinding life is used with the surface region for face grinding and only 20% of the grinding life is used with the surface region for circumferential grinding, the removal properties can be provided in such a way that the lifetimes are adapted accordingly. An example of such a use is one in which the grinding and/or cutting tool is intended to grind edges but the surface region for face grinding is intended only to machine rectilinear and convexly curved regions of the edge, and the surface region for circumferential grinding is to be used for concavely curved regions.

If the different surface regions are provided to achieve different effects in the machining of the workpiece, the grinding and/or cutting tool can advantageously be adapted to the mechanical loads that are to be expected in each case. Since much greater loads are applied to the respective surface region in cutting or roughing than, for example, in precision grinding, the material properties can be adapted accordingly.

The surface regions expediently differ from one another in terms of their material properties, preferably in that they have different abrasives, which are preferably present as abrasive particles of e.g. corundum, quartz, pumice, diamond, silicon carbide and/or cubic boron nitride, different abrasive particle shapes and sizes, particle scatter, granules, hardness, structure, support materials and/or binders.

In one embodiment of the invention, the grinding and/or cutting tool has a rotationally symmetrical shape.

The surface region for face grinding expediently has the shape of a base of a circular cylinder or a lateral surface of an ellipsoid, a cone or a portion of a cone or of an ellipsoid. In the case that the surface region for face grinding has the shape of a lateral surface of a cone, an angle between the surface lines of the surface region and the axis of symmetry of the lateral surface ("half aperture angle") is expediently more than 60°, particularly preferably more than 65°, preferably less than 85°, particularly preferably less than 80°.

In one embodiment of the invention, the surface region for circumferential grinding or cutting has at least in part the shape of a lateral surface of a right circular cylinder or of a cone and/or a curved, preferably convex, shape. In the case that the surface region for circumferential grinding and/or cutting has the shape of a lateral surface of a cone, an angle between the surface lines of the surface region and the axis of symmetry of the lateral surface ("half aperture angle") is <3°, particularly preferably <2°.

If the surface region is provided for cutting, it can have the shape of a knife edge. It then preferably has a breadth of at most 5 mm, preferably at most 3.5 mm. In one embodiment of the invention, the surface region for cutting is preferably continuously round, in particular at its radially outer edge, apart from a roughness that is needed for the grinding or cutting. It is preferably free of saw teeth. While it would be conceivable that the surface region for cutting is provided at the radially outer edge with material recesses such as slits in order to form a segmented cutting disk, in the preferred embodiment it has an uninterrupted edge face at the radially outer edge.

In one embodiment of the invention, a transition region is formed between the surface region for face grinding and the surface region for circumferential grinding and/or cutting, in which transition region the grinding and/or cutting tool can be used both for face grinding and also for circumferential grinding and/or cutting.

The grinding and/or cutting tool expediently comprises a straight disk, a grinding cup or a grinding plate. The surface region for circumferential grinding and/or cutting is preferably formed at an outer edge or an outer circumferential face of the grinding disk or of the grinding cup or at an outer edge of the grinding plate. The surface region for face grinding is expediently formed at at least one of the main surfaces of the grinding disk or of the grinding cup or at a top side and/or bottom side of the grinding plate adjoining the edge.

In one embodiment of the invention, the grinding and/or cutting tool has two of the surface regions for face grinding, and the two surface regions for face grinding are preferably arranged at a distance from each other. The different surface regions for face grinding are expediently arranged on mutually opposite main surfaces of the grinding disk or of the grinding cup or on a bottom side and a top side of the grinding plate that lie opposite each other. By turning the grinding and/or cutting tool around on a grinding machine, both main surfaces, or the top side and the bottom side, can be used for face grinding.

The surface region for circumferential grinding or cutting is expediently arranged between the two surface regions for face grinding and preferably separates these from each other.

In one embodiment of the invention, at least one of the surface regions for face grinding adjoins the surface region for circumferential grinding or cutting or is arranged at a distance therefrom.

In one embodiment of the invention, at least the surface region for circumferential grinding or cutting, on the one hand, and at least one of the surface regions for face grinding, on the other hand, have different material properties. Preferably, the surface regions for face grinding can be provided for roughing (preliminary grinding), intermediate grinding or finish grinding, and the surface region for circumferential grinding or cutting can be provided for intermediate grinding, finish grinding or cutting.

In a particularly preferred embodiment of the invention, the different surface regions for face grinding differ in terms of their shapes. If the different surface regions for face grinding have different shapes from each other, the abovementioned shapes of the surface regions for face grinding, e.g. circular cylindrical, conical or ellipsoid shapes, can be combined with one another in the grinding and/or cutting tool. Moreover, one of the surface regions for face grinding can be provided, for example, for roughing, and the other surface region for face grinding can be provided or for precision grinding.

In a further embodiment of the invention, the grinding and/or cutting tool has a face grinder, which comprises the surface region for face grinding, and a circumferential grinder and/or cutter, which comprises the surface region for circumferential grinding and/or cutting. The grinding and/or cutting tool is expediently provided in such a way that the face grinder and/or the circumferential grinder and/or cutter can be fastened releasably to the grinding and/or cutting tool, wherein the releasable fastening can take place preferably by means of screws. The face grinder and/or the circumferential grinder and/or cutter are preferably releasably connectable to each other. The face grinder or the circumferential grinder and/or cutter can be detached from the grinding and/or cutting tool and, if appropriate, replaced if it has become worn through use. Advantageously, the costs for operating the grinding and/or cutting tool can be considerably reduced in this way, since the respective component can be replaced after it has become worn. In addition, it is possible to equip the grinding and/or cutting tool with face grinders and/or with circumferential grinders and/or cutters which each differ in terms of their properties, in particular the removal properties. Advantageously, the machining properties of the grinding and/or cutting tool can thus be changed and adapted to the respective requirements.

It will be appreciated that the concept of releasably fastening the grinding and/or cutting tool to the face grinder and/or the circumferential grinder and/or cutter represents an independent invention that can also be advantageously employed when the surface region for face grinding and the surface region for circumferential grinding and/or cutting do not have removal properties differing from one another.

The grinding and/or cutting tool expediently has a main body which is formed as a grinder or cutter at least in the surface region for circumferential grinding and/or cutting.

In one embodiment of the invention, the main body is designed as a grinder, preferably as a grinding disk, grinding cup or grinding plate, and/or as a cutter, in particular as a cutting disk. The main body is preferably formed from a substance combination of abrasive and of a binder as a support for the abrasive, which substance combination preferably comprises a reinforcement of fibers, e.g. glass fibers. It can be formed uniformly from a single material. Moreover, the main body could be provided with a cover having the abrasive. The cover can be a coating which comprises abrasive particles, for example a diamond coating. In a further embodiment of the invention, the main body is formed in part from different materials. It has proven particularly expedient if, in regions that are greatly stressed by the grinding or cutting during the grinding and/or cutting, the main body is formed from another material than in regions that are subjected to less mechanical stress. For example, in greatly stressed regions, the main body could be formed from more resistant material, in order to achieve a long useful life there, and, in other regions, from less resistant material. Advantageously, the material costs for producing the grinding and/or cutting tool can be reduced in this way, since more cost-effective material can be used for the less strongly loaded regions.

The main body is provided with the abrasive preferably at least, if appropriate exclusively, in a region of the main body that is intended to engage on the material to be machined during the grinding and/or cutting. In the preferred embodiment of the invention, the main body is provided with abrasive only in one or more of the surface regions, and it is free of abrasive outside the one or more surface regions. The surface region for face grinding, in which the abrasive is provided, expediently has a thickness of at most 7 mm, preferably at most 5 mm. Advantageously, compared to a main body provided entirely with abrasive, the production costs are lower, since the abrasive in itself entails comparatively high costs.

In one embodiment of the invention, the main body is provided in such a way that it can be used on both sides, in particular on both main surfaces. The main body can be arranged in two positions of use in the grinding and/or cutting tool. Advantageously, after it has become worn on a first main surface, the main body can be turned around in the grinding and/or cutting tool, and the lifetime of the grinding and/or cutting tool can thus be doubled. This proves particularly advantageous if at least the outer contour of the main body usable as said surface region is surface-symmetrical.

The main body can form the abovementioned circumferential grinder and/or cutter.

In a further embodiment of the invention, the grinding and/or cutting tool comprises a support body which is provided for arrangement on the main body and for receiving an abrasive body, for example an, in particular plate-shaped or film-shaped, abrasive onlay. The support body can preferably be fastened, particularly preferably releasably, to the main body, preferably by means of screws.

The support body is expediently formed from plastic, from a composite material, preferably with fiber reinforcement, from metal, for example a sheet metal, from cardboard adhesively bonded in multiple layers, or from paper adhesively bonded in multiple layers. To save material, it can be provided with one or more recesses, which can optionally be filled with a vibration-inhibiting substance, if appropriate a rubber or the like.

At least one of the surface regions for face grinding is expediently formed by an, in particular plate-shaped or film-shaped, abrasive onlay, which is arranged on the main body and/or the support body and is connected thereto.

The support body can form the abovementioned face grinder.

The abrasive onlay is preferably formed by an abrasive sheet, an abrasive sheet, an abrasive band, an abrasive film or an abrasive paper. In the preferred embodiment of the invention it is firmly connected to the main body and/or the support body, for example by adhesive bonding. By this measure alone, the grinding and/or cutting tool is given additional mechanical stability, which has a positive effect particularly in face grinding, in particular in roughing. In order to give the grinding and/or cutting tool particularly good stability, the abrasive onlay is preferably formed by a composite material. The composite material expediently has a backing fabric of fibers, e.g. glass fibers, and a matrix of plastic in which the abrasive is distributed.

In a further embodiment of the invention, the main body and/or the support body has at least one recess into which the abrasive onlay can be placed.

The recess is expediently formed in the main body and/or the support body as a depression with such a depth that the abrasive onlay, when fastened to the main body and/or the support body, reaches the same height as an edge of the depression or protrudes above the edge. The recess is expediently arranged at a distance from the surface region for circumferential grinding or cutting. If the last-mentioned surface region is formed by the main body and/or the support body, it can form, on the one hand, the outer edge of the grinding and/or cutting tool and, on the other hand, the edge of the recess.

The surface region for circumferential grinding or cutting expediently terminates the grinding and/or cutting tool radially to the outside. Advantageously, during the circumferential grinding and/or cutting, at least the radial edge of the abrasive onlay provided for face grinding does not come into contact with the workpiece that is to be machined. It has proven particularly advantageous if the surface region for circumferential grinding or cutting is provided in such a way that it engages radially around the abrasive onlays of the surface region for face grinding.

The main body and/or the support body expediently has at least one projection, preferably several projections, for supporting the abrasive onlay against displacement relative to the main body and/or the support body, wherein the projection is preferably formed by a web which extends in particular in the radial direction and which protrudes from a surface of the main body and/or of the support body intended to receive the abrasive onlay.

In one embodiment of the invention, at least one step, preferably several steps, for receiving abrasive onlay portions forming the abrasive onlay are formed in the main body and/or the support body at the surface for face grinding and/or at the surface for circumferential grinding and/or cutting. The abrasive onlays are preferably arranged on the steps in such a way that they each bear with one of their edges on the edge of a respective one of the steps. Advantageously, the abrasive onlays can then, on the one hand, be fastened particularly firmly to the main body or the support body, and, on the other hand, they can also be arranged lying over one another very well. The step expediently has a height corresponding to the height of an abrasive onlay portion, if appropriate together with the adhesive for fastening the latter to the main body and/or the support body.

If the step or steps is or are formed in succession in the radial direction, particularly if the step or steps is or are formed ascending inward in the radial direction, two or more of the onlay portions in the surface region for face grinding on the grinding and/or cutting tool can be arranged lying over one another radially toward the outside. In this way, in the outer region of the grinding and/or cutting tool that is normally subjected to particularly strong loads, a greater thickness of the material forming the abrasive onlay can advantageously be arranged and the duration of use can thus be extended.

If several of the steps are formed ascending or descending in the circumferential direction, the main body and/or the support body is particularly well suited for forming a fan-like disk, in which the onlay portions in the surface region for face grinding are arranged lying partially over one another in the manner of a fan. Advantageously, the individual onlay portions can then be adhesively bonded exclusively to the main body and/or the support body, and they are otherwise simply formed lying over one another without adhesive bonding.

In one embodiment of the invention, the steps are formed ascending or descending in the circumferential direction in the main body for the surface region for circumferential grinding and/or cutting, so that there too the onlay portions can be arranged lying partially over one another as in a fan-like disk.

In a further embodiment, in the main body and/or the support body, which is preferably substantially disk-shaped, edges of the steps are arranged in the radial direction and/or along at least one circular line which is parallel to an edge of the grinding and/or cutting tool.

It will be appreciated that the above-described features, both of the different main bodies and/or support bodies and also of the abrasive onlays, can advantageously be used independently of one another and represent per se an invention. In particular, the main bodies and/or the support bodies and the abrasive onlays can also be used in grinding tools and/or in cutting tools that are provided only for face grinding or only for circumferential grinding or cutting.

In a further embodiment of the invention, the surface region for circumferential grinding and/or cutting has at least one portion for circumferential grinding and a portion for cutting, which protrudes radially outward from the portion for circumferential grinding. The cutting portion is expediently formed by a disk having a thickness of <5 mm, preferably <4 mm. If a portion for circumferential grinding is formed on one side of the cutting portion or if portions for circumferential grinding are formed on both sides of the cutting portion, a workpiece can first of all be cut by the cutting portion of the grinding and/or cutting tool and can thereafter be machined directly by means of the portion for circumferential grinding.

A grinding and/or cutting tool of this kind is particularly suitable for machining a pipe. For example, a pipe wall can be cut through by means of the cutting portion, and, at the edge where the pipe has been separated by means of the cutting portion, a shape can be ground directly by means of the grinding and/or cutting tool, without the need to change the tool. Thus, for example, the edge can be ground smooth or, for example, a bevel can be formed at the edge of the pipe, which is advantageous for welding the pipes.

In a development of the invention, the grinding and/or cutting tool is provided with a grinding machine for driving and/or holding the grinding and/or cutting tool.

In a development of the invention, a mechanism is provided for the grinding machine, for holding the grinding machine in a position for the machining of a workpiece.

In a further embodiment of the invention, the holding mechanism comprises a stop with which the grinding machine can be supported securely against tilting on the workpiece to be machined and can be arranged in a position for the machining of the workpiece by grinding or cutting. The stop expediently has at least one roller or a sliding block that can be placed against the workpiece.

Advantageously, by means of the holding mechanism, the grinding machine can be arranged on the workpiece in a position in which the surface region for cutting or circumferential grinding or the surface region for face grinding are arranged in such a way that the workpiece can be machined by both surface regions.

In one embodiment of the invention, a guide mechanism is provided for the grinding machine, with which guide mechanism the grinding machine is supported in a direction perpendicular to the rotation axis of a shaft in which the grinding and/or cutting tool is fastened. The guide mechanism is expediently formed by at least one web, which protrudes from the grinding machine. The web preferably protrudes from the grinding machine to such an extent that, in relation to the grinding or cutting tool, it extends radially beyond the grinding and/or cutting tool.

If the workpiece to be machined is a pipe, which preferably has a round cross section, in particular a circular cross section, the holding mechanism is expediently provided to hold the grinding machine on an edge at one end of a pipe.

The holding mechanism is expediently provided to hold the grinding machine in such a way that, during the machining of the pipe edge, it can move along the pipe edge and in so doing supports itself on the pipe.

The grinding and/or cutting tool according to the invention can be used particularly advantageously in combination with the grinding machine and the holding mechanism. If, for example, a shape is to be introduced into the edge of the pipe, which shape is necessary for connecting the pipe end by welding, for example a so-called tulip shape, the grinding and/or cutting tool can on the one hand be guided particularly easily and exactly with the holding mechanism, and, on the other hand, the removal properties of the surface region for face grinding and of the surface region for circumferential grinding, which both act in the machining of the edge, can be provided in terms of their removal properties in such a way that they wear in a uniform manner.

In a particularly preferred embodiment of the invention, the holding mechanism has at least one rotatable roller which can be placed on the inner side of the pipe or the outer side of the pipe and by means of which a connecting part of the holding mechanism, on which the grinding machine is to be arranged, is movable along the edge.

The holding mechanism expediently has at least two of the rollers, and the rollers can be placed simultaneously on the inner side of the pipe and/or the outer side of the pipe. The holding mechanism is preferably provided in such a way that the rollers can be placed simultaneously only on the inner side of the pipe, only on the outer side of the pipe, or on the inner side of the pipe and the outer side of the pipe.

A particularly stable arrangement of the holding mechanism on the pipe can be achieved if, upon placement of the rollers on the pipe, two of the rollers are provided at least on the inner side of the pipe or on the outer side of the pipe.

In one embodiment of the invention, the holding mechanism comprises an additional support roller which is to be arranged on the grinding and/or cutting tool and which is rotatable about a rotation axis coaxial to the rotation axis of the grinding and/or cutting tool, and by means of which the holding mechanism can be supported on the pipe. The support roller is expediently arranged on that side of the grinding and/or cutting tool directed away from the side of the grinding and/or cutting tool on which a shaft of the grinding machine carrying the grinding and/or cutting tool is arranged.

In one embodiment of the invention, the position of the roller or of the rollers is adjustable from the grinding machine or the grinding and/or cutting tool, so as to be able to adapt the holding mechanism to the respective pipe diameter and/or the respective grinding and/or cutting tool.

Moreover, the distance of the rollers from each other can be adjustable. The holding mechanism can be adapted to the size of the diameter and the thickness of the pipe that is to be machined. Particularly if the distance between the rollers is adjustable in a stepless manner, the rollers can be arranged with mutual clamping on the pipe.

In a particularly preferred embodiment of the invention, the holding mechanism has a mechanism for adjusting the position of the rollers, which mechanism can be operated by hand, by motor, preferably by an electric motor, hydraulically or pneumatically, for example is adjustable via a spindle gear.

In one embodiment of the invention, the holding mechanism has an adjustment mechanism for arranging the at least one roller with clamping on the pipe.

In a further embodiment of the invention, the holding mechanism has a mechanism for fastening it to the inner side of the pipe. The fastening mechanism for the holding mechanism, and thus for the grinding machine, advantageously forms a reference point in the direction of the axis of symmetry of the pipe. Moreover, the holding mechanism can be easily fastened to the pipe, without interfering in the machining of the edge. This is achieved by, among other things, the fact that the fastening mechanism, as provided in a particularly preferred embodiment of the invention, engages on the inner side of the pipe at a distance from the edge that is to be machined. During the machining of the pipe edge, the grinding and/or cutting tool and the roller can be moved along the inner side of the pipe and/or the outer side of the pipe, without abutting the fastening mechanism.

The fastening mechanism is preferably configured for clamping the holding mechanism on the inner side of the pipe.

In one embodiment of the invention, the holding mechanism comprises a means for rotating the grinding machine about the axis of symmetry of the pipe, in order to permit machining of the edge of the pipe.

The fastening mechanism expediently comprises at least two clamping elements, preferably at least three clamping elements, for supporting the holding mechanism on the inner side of the pipe. Particularly if the clamping elements protrude from the guide body at angles identical to each other, the holding mechanism can be arranged in a centered manner in the pipe.

The clamping elements for clamping the holding mechanism are expediently movable away from the guide body in the radial direction. For this purpose, the clamping elements can be extended out from or folded away from the guide body. For this purpose, they preferably comprise a preferably clampable threaded spindle or toothed rod, a parallelogram guide, a scissor frame, a deployable lever frame, which is preferably actuatable with one lever side by means of the guide body and can be placed with the other lever side on the inner side of the pipe, and/or a linear motor for extension of a clamping member. In order to achieve a centered arrangement of the fastening mechanism in the pipe interior, the fastening mechanism is expediently configured in such a way that support members of the clamping elements, which are to be placed on the inner side of the pipe, can also be arranged in different positions, always at the same radial distance from the guide body.

The invention is explained in more detail below on the basis of illustrative embodiments and with reference to the accompanying drawings, which relate to the illustrative embodiments and in which:

DETAILED DESCRIPTION OF THE INVENTION

Figure 1:
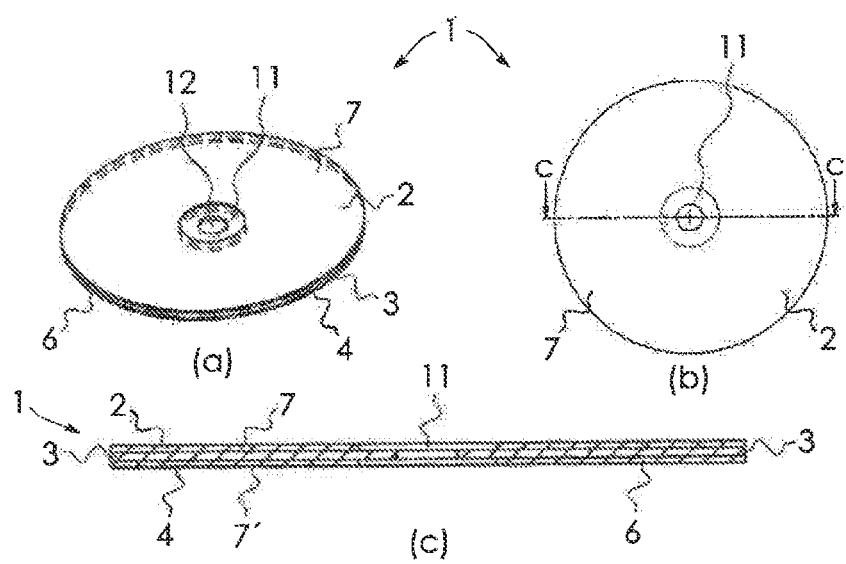
FIGS. 1 to 10 show various grinding and/or cutting tools according to the invention, in each case in different views.

FIG. 1 shows a grinding and cutting tool 1 according to the invention, which is substantially disk-shaped. It comprises a sleeve 11 with which it can be fastened to a grinding machine, for example an angle grinder, and a main body 6 which is connected rigidly to the sleeve 11 and which is formed from a substance combination that comprises a binder with added abrasive. Abrasive onlays 7, 7', which form surface regions 2, 4 for face grinding, are arranged on mutually opposite main surfaces of the main body 6. A surface region 3 for cutting at an outer edge 5 of the grinding and cutting tool 1 is formed by the main body 6. The sleeve 11 is of such a shape that it can be fastened with both sides to the grinding machine.

The substance combination from which the main body 6 is formed is suitable for introducing a cut, with the surface region 3 of the cutting and grinding tool 1, into a workpiece in order to cut the latter. The abrasive onlays 7, 7' are provided to be used for face grinding. Provision can be made that the two abrasive onlays 7, 7' are formed from the same material or from different materials. In the first case, the lifetime of the grinding and cutting tool 1 increases by comparison with a grinding tool that can be used only with one side, since the grinding and cutting tool 1 can be turned on a grinding machine and fastened the other way round, if one of the surface regions 2, 4 is worn. In the second case, different grinding effects on a workpiece that is to be machined can be achieved with the different surface regions 2, 4.

Reference is now made to FIGS. 2 to 12, where identical parts or parts that have an identical action are designated by the same reference number as in FIG. 1, with a letter being added in each case to the respective reference number.

Figure 2:
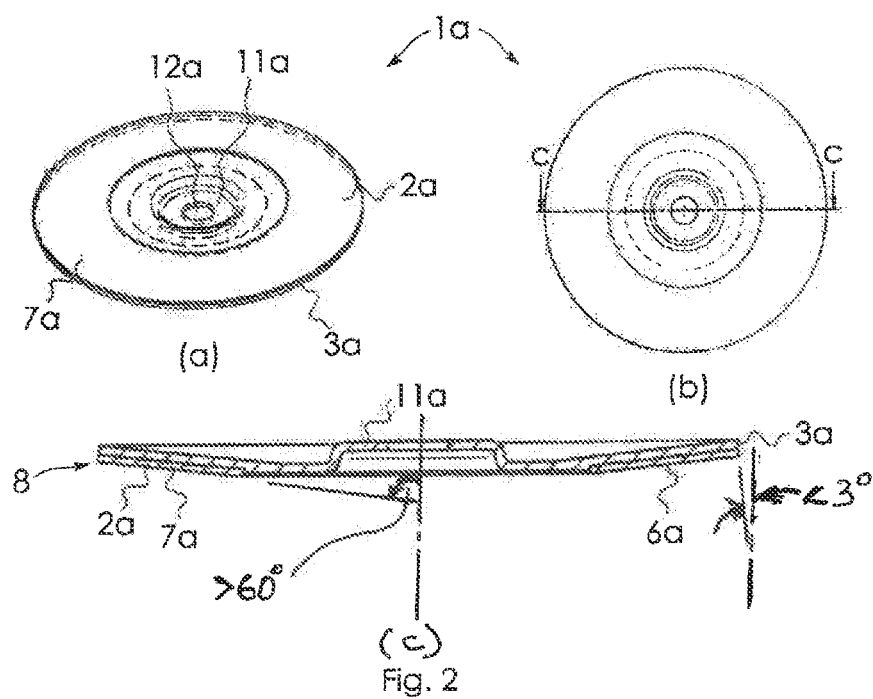

A grinding and cutting tool 1a shown in FIG. 2 has substantially the shape of a grinding plate. A main body 6a of the grinding and cutting tool 1a is connected to a sleeve 11a for fastening to a grinding machine and has on its surface a recess 8 into which an abrasive onlay 7a is inserted, which forms a surface region 2a for face grinding. The surface region 2a for face grinding has the shape of a lateral surface of a cone. A radially outer edge of the main body 6a forms a surface region 3a for cutting. With the grinding and cutting tool 1, it is possible, on the one hand, to carry out face grinding by means of the conical surface region 2a and to cut material of a workpiece by means of the surface region 3a.

Figure 3:
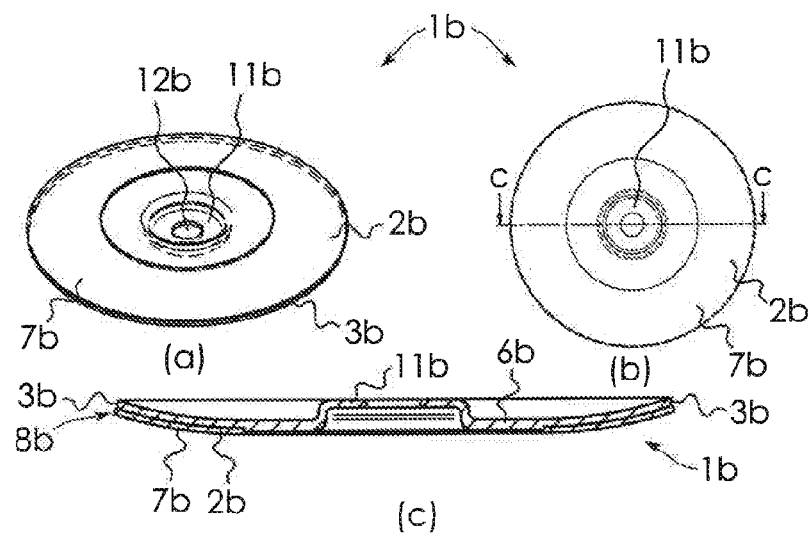

FIG. 3 shows a further grinding or cutting tool 1b, which differs from the tool according to FIG. 2 mainly in that a surface region 2b for face grinding, formed by an abrasive onlay 7b, has a convexly curved shape. Material can be cut using a surface region 3b at the radial outer edge of a main body 6b.

Figure 4:
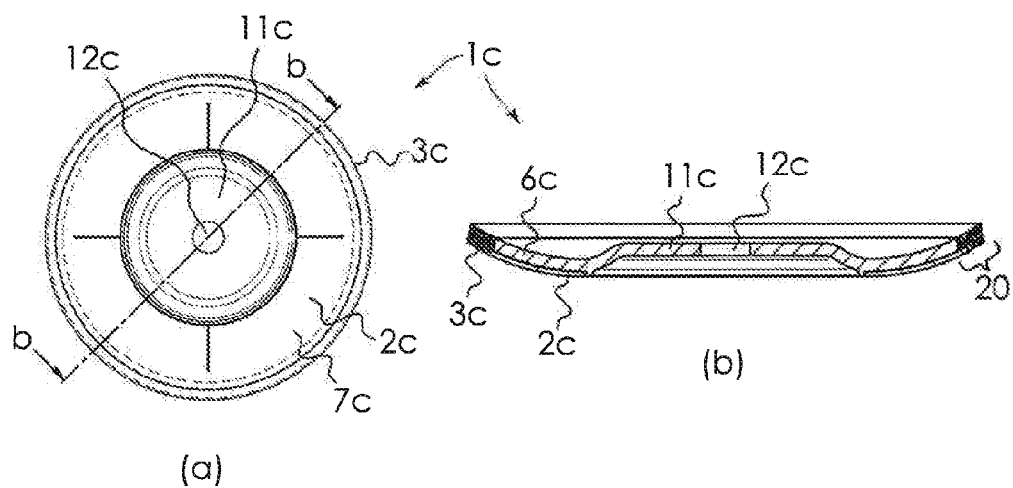

A further grinding and cutting tool 1c, shown in FIG. 4, differs from the tool according to FIG. 3 particularly in that a main body 6c has two different material regions. In contrast to the illustrative embodiments described above, the main body 6c has abrasive material only in an edge region 20, which forms a surface region 3c for grinding and/or cutting, and it is free of the abrasive material outside the edge region 20. It is advantageous, for the production of the main body 6c, that the comparatively expensive abrasive material needs to be provided only in the edge region 20. For this reason, the main body 6c and therefore the entire grinding and cutting tool can be produced more cost-effectively.

Figure 5:
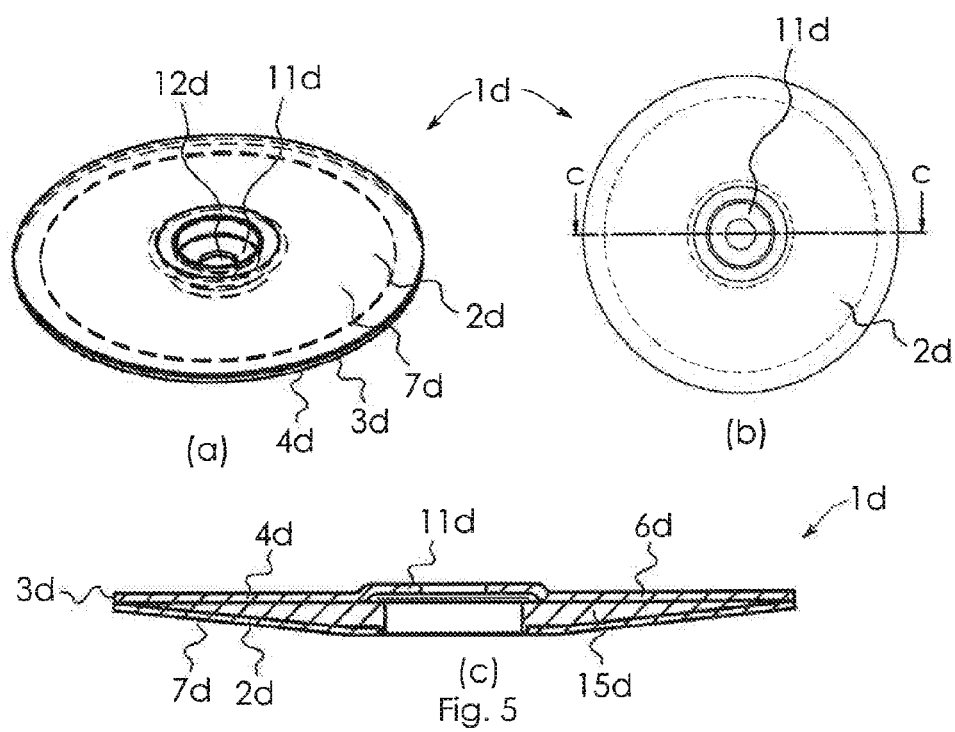

FIG. 5 shows a further grinding and cutting tool 1d according to the invention, which has substantially the shape of a grinding plate. It comprises a main body 6d formed from a substance combination comprising a binder with added abrasive. An outer main surface of the main body 6d is designed as a surface region 4d for face grinding. Moreover, an edge of the main body 6d forms a surface region 3d for cutting. Arranged on the other main surface of the main body 6d is a support body 15 to which a grinding onlay 7d is fastened which forms a surface region 2d for face grinding. The support body 15 is shaped in such a way that the surface region 2d has the shape of a lateral surface of a cone. The grinding and cutting tool 1d can be used in three different functions, namely with the surface region 2d for face grinding with a conical surface shape, with the surface region 4d for face grinding for grinding with a plane surface shape, and with the surface region 3d for cutting a workpiece.

Figure 6:
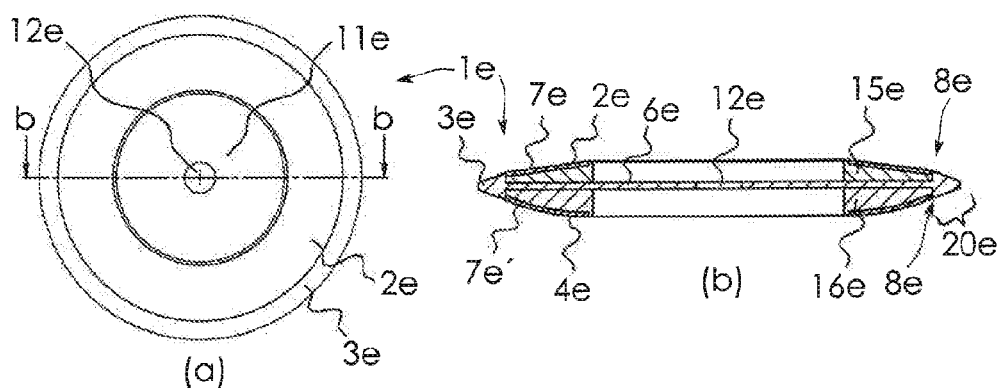

A cutting and grinding tool 1e shown in FIG. 6 comprises a main body 6e made from a substance combination of binder and abrasive. The main body 6e has a radially outer edge that is thicker compared to an inner region of the main body 6e. The outer edge forms a surface region 3e by means of which a workpiece can be cut or can be machined by circumferential grinding. Inward from the edge region 20e, support bodies 15e, 16e are arranged on both sides of the main body 6e, said support bodies 15e, 16e being provided with recesses 8e, 8e' for receiving abrasive onlays 7e, 7e' that form surface regions 2e, 4e for face grinding. The top side and the underside of the edge region 20e, the support bodies 15e, 16e and the onlays 7e, 7e' are adapted in size to one another in such a way that the respective surfaces of the edge region 20e and of the abrasive onlays 7e, 7e' are arranged at the same height, such that no step is formed there. The support body 15e is shaped in such a way that the surface region 2e has the shape of a lateral surface of a cone. The support body 16' is of such a shape that the surface region 4e is convexly curved. The grinding and cutting tool 1e also allows a workpiece to be machined in different ways with the different surface regions 2e, 3e, 4e.

Figure 7:
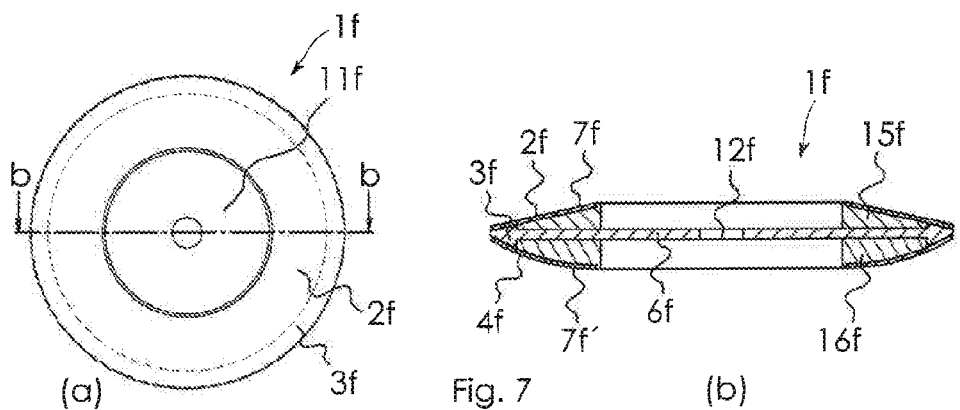

A further grinding and cutting tool 1f, shown in FIG. 7, differs from the tool according to FIG. 6 particularly in that abrasive onlays 7f, 7f' are also arranged on a surface region 20f at the edge of a main body 6f. In this way, larger grinding surfaces are created on both surface regions 2f, 4f for face grinding.

Figure 21:
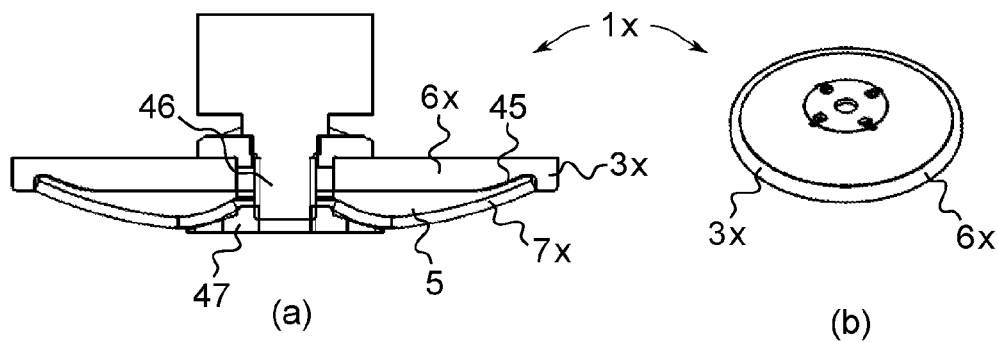

FIG. 21 shows a further grinding and/or cutting tool 1x, having a main body 6x whose edge forms a surface region 3x for circumferential grinding, and having a support body 5 which can fastened releasably to the grinding and/or cutting tool 1x or can be connected releasably to the main body 6x. An abrasive onlay 7x is fastened, e.g. by adhesive bonding, to the support body 5. The main body 6x is provided with a circular groove 45 into which protrude the outer edge of the support body 5 and the abrasive onlay 7x. In the present example, the grinding and/or cutting tool 1x comprises a shaft 46 with an outer thread, at which the main body 6x and the support body 5 can be braced against each other by means of a clamping nut 47. Alternatively, the releasable connection could be formed by the support body 5 being screwed directly onto the main body 6x.

Figure 22:
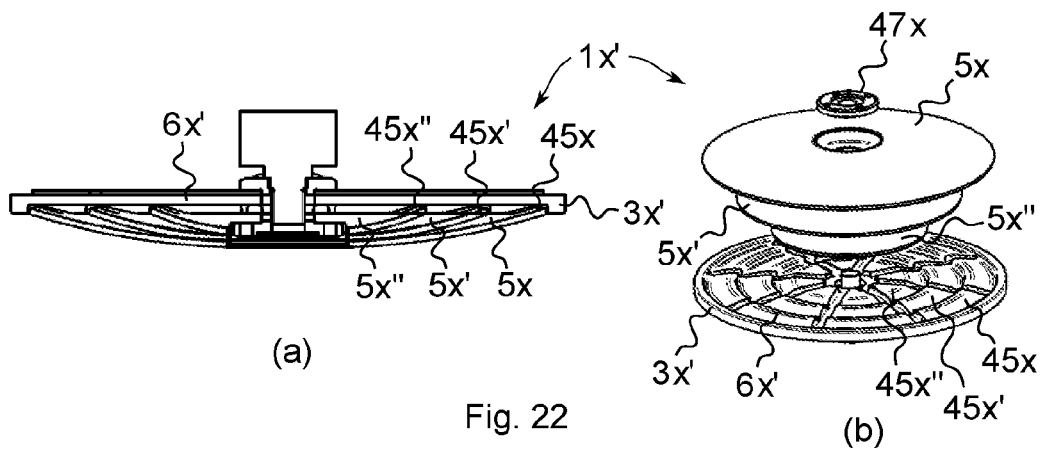

A grinding and/or cutting tool 1x', shown in FIG. 22, differs from the tool according to FIG. 21 in that three circular grooves 45x, 45x', 45x" are formed coaxially in a main body 6x'. Support bodies 5x, 5x', 5x" of different diameter can be attached to the main body 6x'. Advantageously, the grinding and/or cutting tool 1x' can also be used further when the diameter of the main body 6x' decreases through the removal of material during circumferential grinding or cutting. As soon as the diameter is reduced to such an extent that its radially outer edge lies in the radial direction at the same height as the radially outer edge of the support body 5x, 5x', the respective support body 5x, 5x' is detached and machining is continued with a smaller one. It is conceivable, as shown in FIG. 22, to arrange three different support bodies 5x, 5x', 5x" on the main body 6x' at the same time. However, in the preferred embodiment of the invention, only one of the support bodies 5x, 5x', 5x" at a time is fastened to the main body 6x', in contrast to what is shown in FIG. 22. In a first phase, the grinding and/or cutting tool 1x' is used with the support body 5x of the greatest diameter. As soon as the main body 6x' has become worn by circumferential grinding or cutting to such an extent that its diameter is the same as or smaller than that of the support body 5x, the support body 5x is taken off and the support body 5x' is attached. Handled in the same way, the grinding and/or cutting tool 1x' can also be used for circumferential grinding with the support body 5x" until the diameter of the main body 6x' has reduced to such an extent that it is the same as or smaller than that of the support body 5x".

Figure 8:
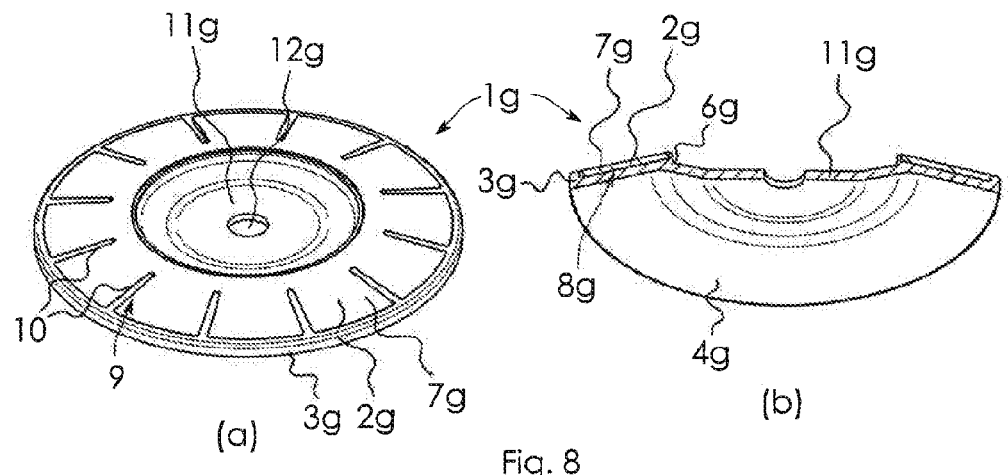

A further grinding tool 1g according to the invention, shown in FIG. 8, is similar in design to the grinding and cutting tool 1a according to FIG. 2. However, it differs from the grinding and cutting tool according to FIG. 2 in that an edge of a main body 6g, which forms a surface region 3g for circumferential grinding, is substantially thicker than the surface region 3a for cutting of the tool according to FIG. 2. A recess 8g for receiving an abrasive onlay 7g is formed at a distance from a radially outer edge of the main body 6g, such that a surface region 3g for circumferential grinding is broader than the region for cutting 3a of the tool according to FIG. 2. As FIG. 8a shows, the abrasive onlay 7g has cutouts 9, which are arranged in the radial direction and at a distance from one another, and the main body 6g has webs 10 which protrude in the radial direction from the edge and have a shape matching the cutouts 9. Advantageously, by virtue of this configuration, the abrasive onlay 7g is better fixed to the main body 6 and additionally supported in the circumferential direction, and its radially outer edge is protected from coming loose during working with the grinding tool 1a, since the edge of the main body 6g protrudes over the end of the abrasive onlay 7g and engages around the latter. Moreover, by virtue of the predefined position, the abrasive onlay 7g can be more easily fastened to the main body 6g.

Figure 9:
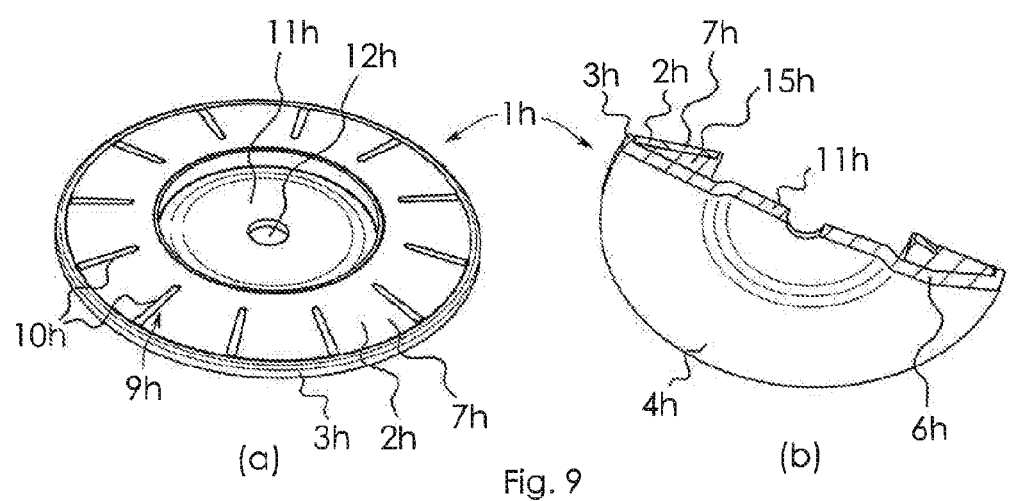

A further grinding tool 1h, shown in FIG. 9, differs from the tool according to FIG. 8 in that a support body 15h, which supports an abrasive onlay 7h, is arranged on a main body 6h. Here too, an edge region, which forms a surface region 3h for circumferential grinding, encloses the abrasive onlay 7h and the support body 15h. The main body 6h, formed from a substance combination of binder and abrasive, is plane on an underside, such that the underside can be used as a surface region 4h for face grinding.

Figure 10:
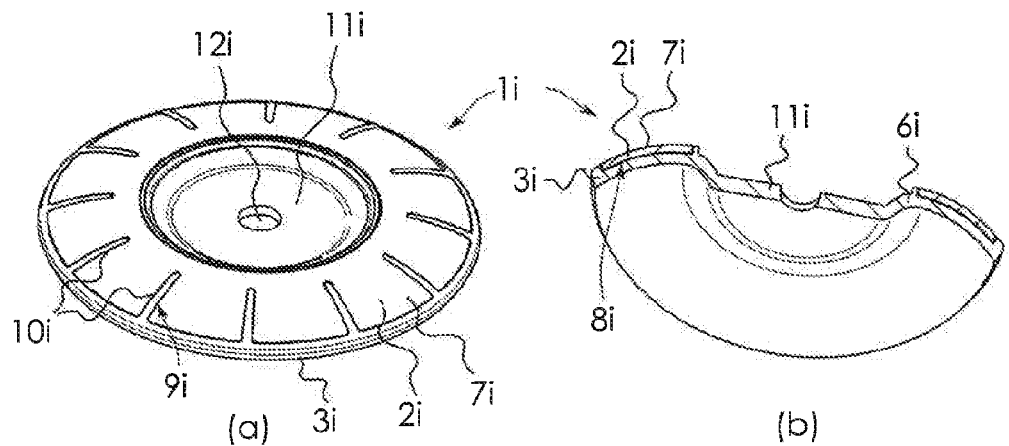

FIG. 10 shows a variant of a grinding tool 1i which, in principle, is configured in the same way as the grinding tool 1g according to FIG. 9, but in which a surface region 2i for face grinding has a concave curvature.

Figure 15:
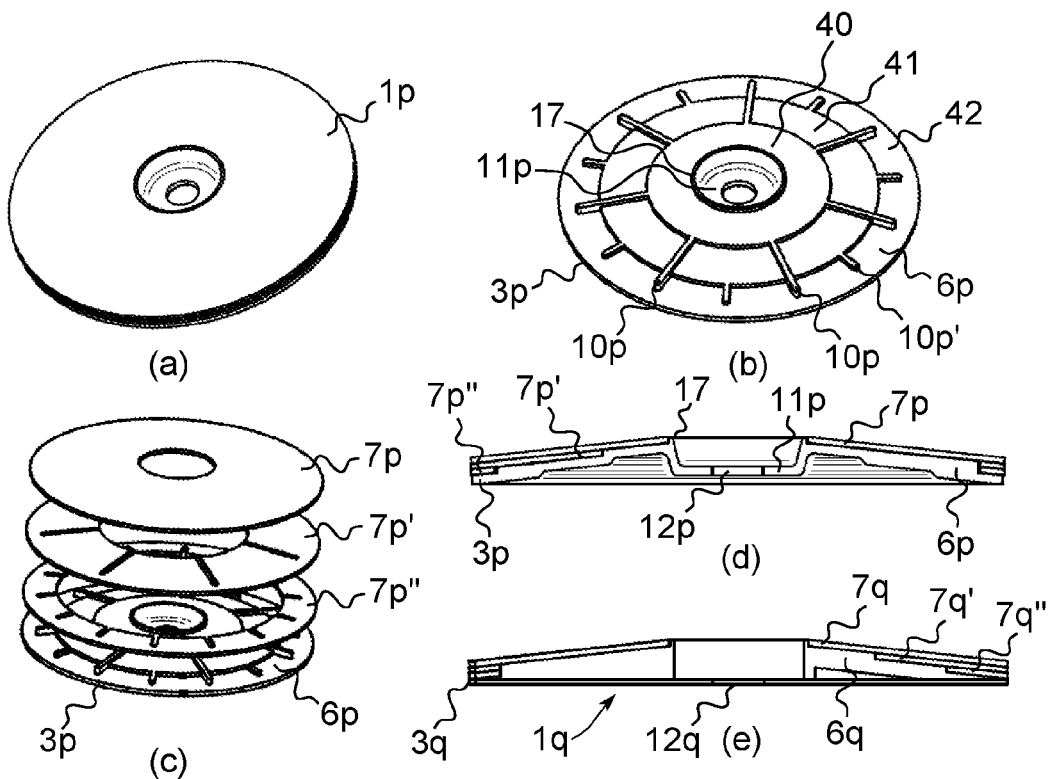
FIGS. 15 to 27 show further various grinding and/or cutting tools according to the invention, in each case in section and in a perspective view.

FIG. 15 shows a further conical grinding and cutting tool 1p according to the invention, having a main body 6b and, arranged on the cutting body 6b, abrasive onlays 7p, 7p', 7p". On the main body 6p, steps 40, 41, 42 are formed which ascend successively from the outside inward in the radial direction, wherein edges of the steps 40, 41, 42 are circular. Starting from the uppermost step 40, rectilinear webs 10p are formed in the radial direction and protrude upward from the steps 41, 42. Moreover, starting from the step 41, webs 10p' are formed which protrude upward from the step 42. To be able to arrange the abrasive onlays 7p, 7p', 7p" on the main body, the abrasive onlays 7p', 7p" are ring-shaped, wherein their external diameter corresponds to the external diameter of the main body 6p, and their internal diameter is chosen such that the abrasive onlays 7p, 7p', 7p" each bear on the outer side of the collar 17 or the outer edges of the steps 40, 41. In addition, the abrasive onlays 7p', 7p" are provided with recesses which each correspond to the shapes of the webs 10p, 10p', such that the abrasive onlays can each bear on the steps 40, 41, 42 by means of the webs 10p, 10p' engaging in the recesses.

The grinding and cutting tool 1p advantageously has the three abrasive onlays 7p, 7p', 7p" in an outer annular region that is normally exposed to particularly strong stresses, and the tool can therefore be used for a particularly long time. The main body 6p is formed from a substance combination of binder and abrasive, and its edge 3p can therefore be used for circumferential grinding or for cutting.

FIG. 15e shows a further grinding and cutting tool 1q according to the invention, which differs from the grinding and cutting tool 1p in that a main body 6q is plane on a side provided to receive abrasive onlays 7q, 7q', 7q" and can thus be used on the plane side in another function for grinding.

Figure 16:
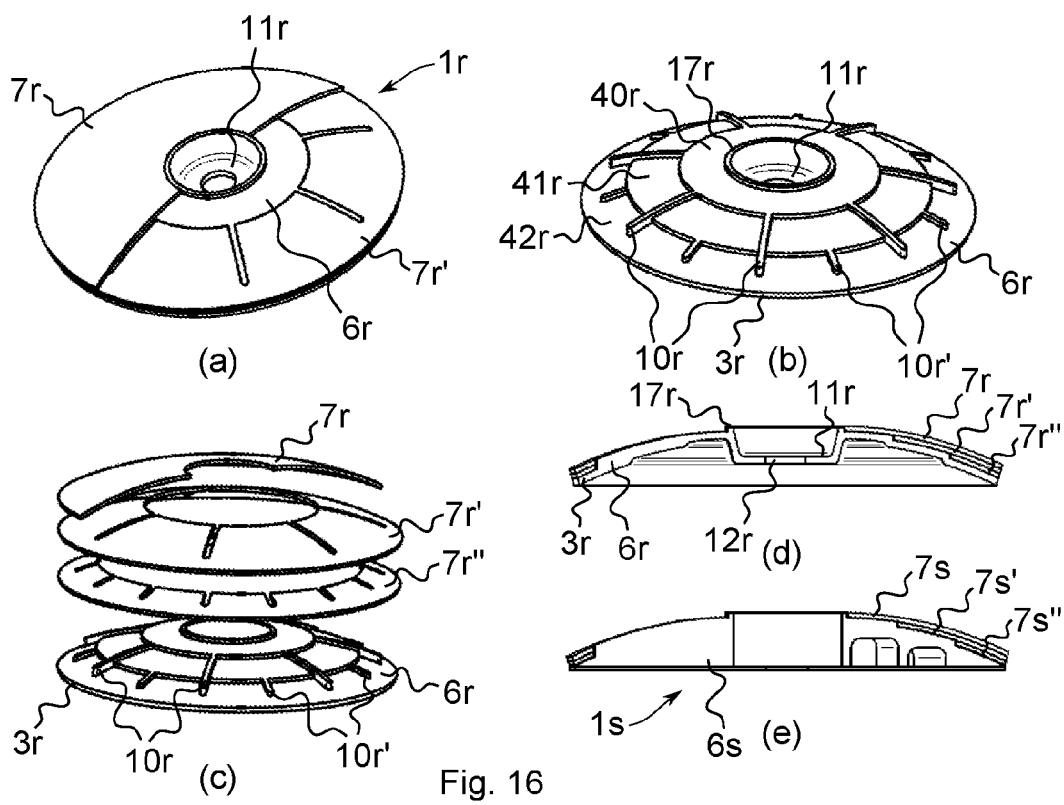

FIG. 16 shows a further grinding and cutting tool 1r according to the invention, which differs from the tool according to FIG. 15 particularly in that a surface of a main body 6r has a convex shape.

FIG. 16c shows a grinding and cutting means 1s whose main body 6s is plane on one side, i.e. a side directed away from the side provided to receive abrasive onlays 7s. Here too, different grinding effects can advantageously be achieved with the different sides.

Figure 24:
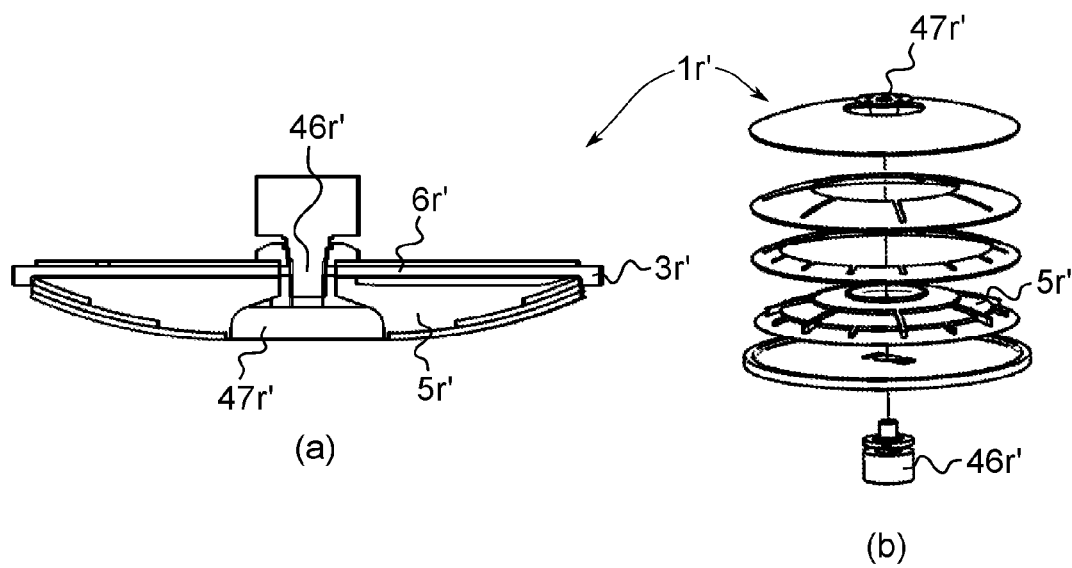

A further grinding and cutting tool 1r' according to the invention is shown in FIG. 24. It differs from the tools according to FIGS. 15 and 16 particularly in that a main body 6r' is disk-shaped and, at its radially outer edge, has a collar-shaped projection that forms a surface region 3r' for circumferential grinding. The grinding and cutting tool 1r' moreover comprises a support body 5r' which has a shape similar to the main body 6r from FIG. 16. The main body 6r' and the support body 5r' can be connected to each other by means of a shaft 46*r*' and a clamping nut 47*r*'. Advantageously, the main body 6*r*' or the support body 5*r*' can be replaced when it becomes worn.

Figure 17:
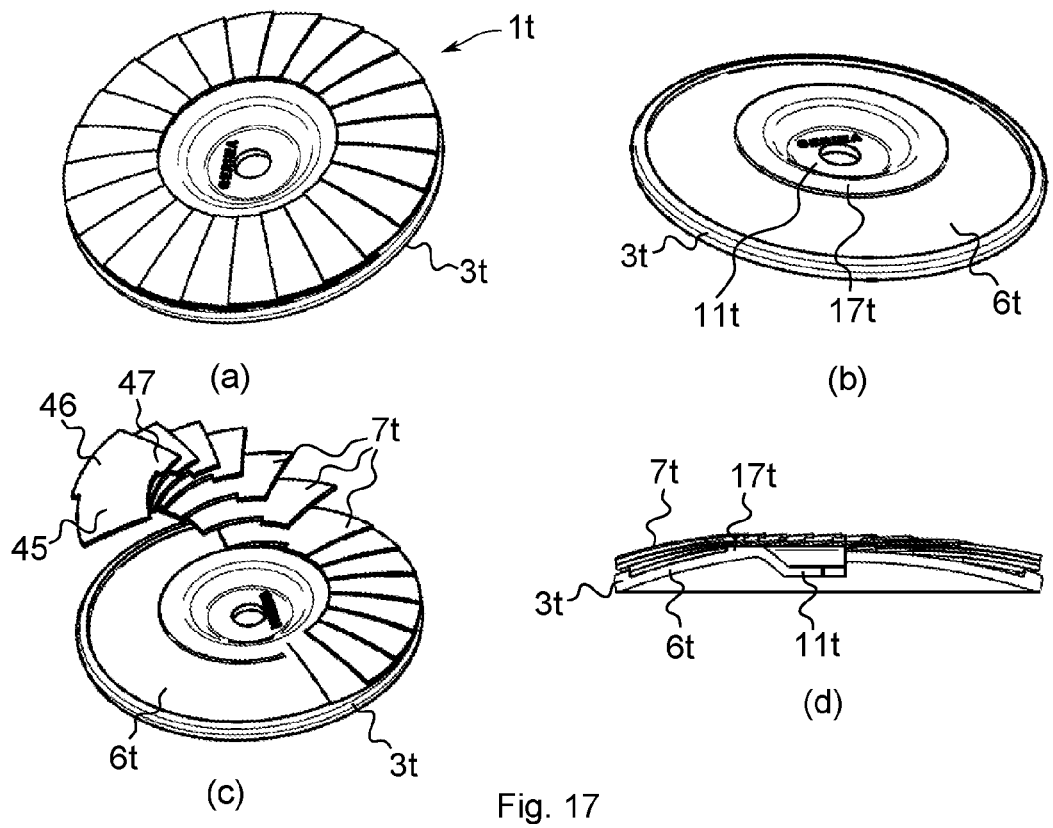

In a further grinding and cutting tool it according to the invention, shown in FIG. 17, abrasive onlays 7*t* are arranged in a fan shape on a main body 3*t*.

The main body 6*t* has, at its outer edge, a collar-shaped projection, which forms an edge 3*t* for circumferential grinding. A ring-shaped surface for receiving abrasive onlays 7*t* is formed between the collar-shaped projection and an inner overhang 17*t* of the main body 6*t*. The abrasive onlays 7*t* have a narrower region 45 which is of such a breadth that they fit on the main body 6*t* between the overhang 17*t* and the outer edge 3*t* and can be secured there. With lateral projections 46, 47, the abrasive onlays can be placed onto the outer edge 3*t* and the inner overhang 17*t*. Apart from the portions with which the abrasive onlays 7*t* are placed directly onto the main body and are secured there, the abrasive onlays 7*t* lie loosely on one another.

As FIG. 17*d* shows in particular, the main body 6*t* has a convex curvature in the region between the outer edge 3*t* and the overhang 17*t*.

Figure 18:
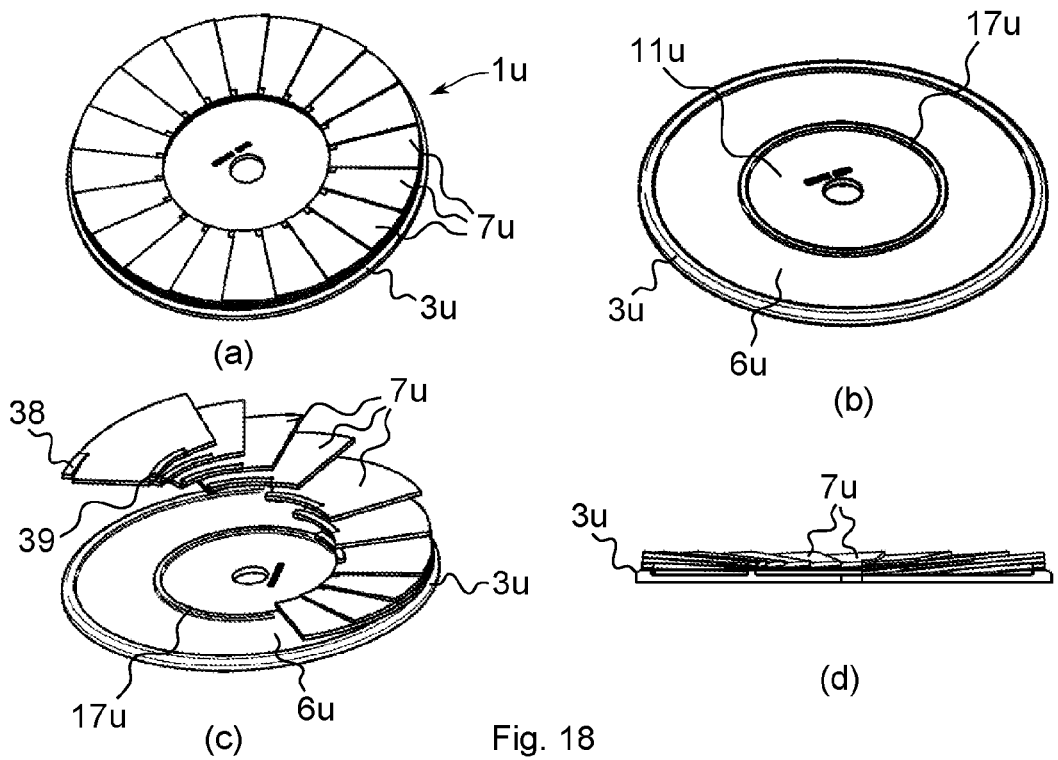

A grinding and cutting tool 1*u*, shown in FIG. 18, differs from the tool according to FIG. 17 in that a main body 6*u* has a plane shape. Moreover, in a region where they are securely bonded to the main body 6*u* between an outer edge 3*u* and an overhang 17*u*, abrasive onlays 7*u* are provided with steps 38, 39 with which they can be securely bonded to the edge 3*u* or to the overhang 17*u*.

Figure 19:
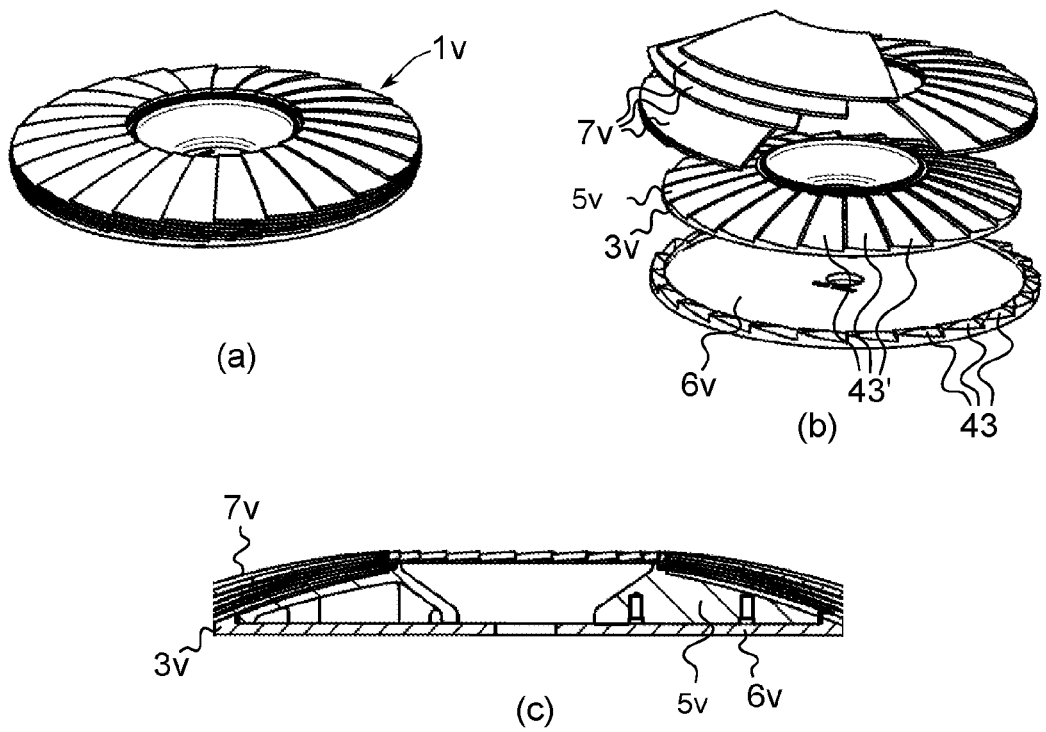

FIG. 19 shows a further grinding and cutting tool 1*v* according to the invention, which is formed a main body 6*v* and a support body 5*v* that can be fitted one into the other. At an edge 3*v* of the main body 6*v* and in the circumferential direction, steps 43 are formed in the circumferential direction 43' and on the main body 6*v* and the support body 5*v*, which steps 43 are provided to receive abrasive onlays 7*v* that are to be placed in a suitable position in a fan shape on the main body 6*v* and the support body 5*v*. When the main body 6*v* and the support body 5 are arranged correctly on each other, the steps are formed continuously in the radial direction as far as the outer edge of the main body 6*v*.

The physical separation of the main body 6*v* and the support body 5*v* makes it possible to produce the main body 6*v* and thus the edge 3*v* from a material with added abrasive and to produce the support body 5*v* from plastic, which is free of the abrasive and is thus more cost-effective. In addition, there is the possibility of detaching the main body 6*v* or the support body 5*v* from the grinding and cutting tool 1*v* and replacing it when it becomes worn. Advantageously, the tool can continue to be used cost-effectively when the only one of the bodies is worn and the other can continue to be used.

The steps 43, 43' formed in the circumferential direction make it possible to arrange and, if appropriate, adhesively bond the abrasive onlays 7*v* on the main body 6*v* and the support body 5*v* in such a position that, when placed on one another, they do not need to have a curved arrangement. Advantageously, this makes it possible to form several layers of the abrasive onlays on the grinding and cutting tool 1*v*, with particularly good binding to the main body 6*v* and if appropriate the support body 5*v*.

Figure 20:
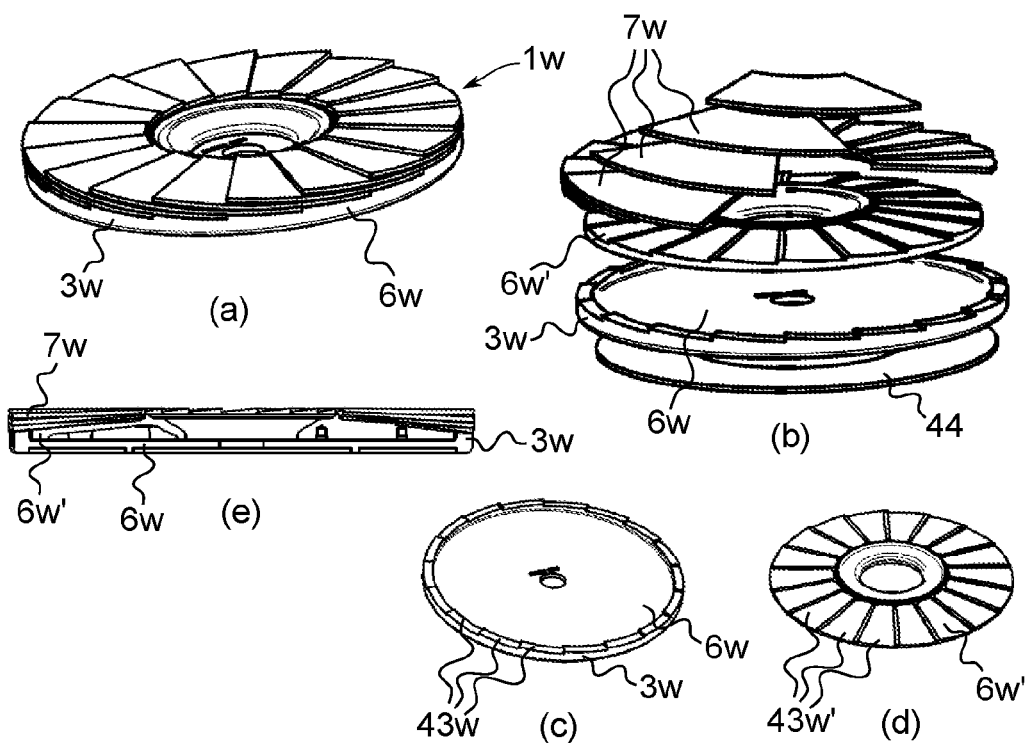

FIG. 20 shows a further grinding and cutting tool 1*w* according to the invention, which differs from the tool according to FIG. 19 particularly in that it has a substantially plane shape. Moreover, a support ring 44 is formed underneath a lower part 6*w* of a main body.

Figure 23:
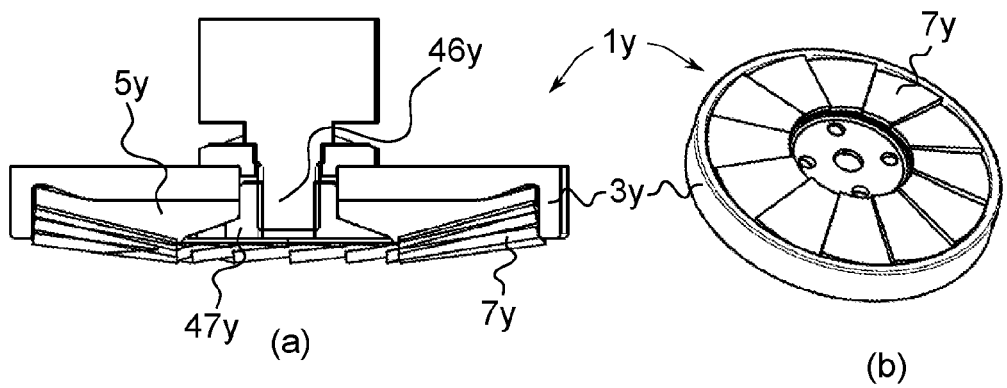

A further grinding and cutting tool 1*y* according to the invention, shown in FIG. 23, differs from the tools according to FIGS. 17 to 20 particularly in that a surface region 3*y* for circumferential grinding, formed on a main body 6*y*, has a collar-shaped projection. The projection is more or less perpendicular to a surface portion of the main body 6*y* on which a support body 5*y* is arranged on which the abrasive onlays 7*y* are fastened by adhesive bonding. The projection is provided in such a position and has such a height that it encloses the abrasive onlays 7*y* in a pot shape. Moreover, the main body 6*y* and the support body 5*y* can be fastened releasably to the grinding and cutting tool 1*y*, such that they can each be taken off and replaced when they become worn. The main body 6*y* and the support body 6*y* can be braced against each other on a shaft 46*y* by means of a clamping screw 47*y*.

Figure 11:
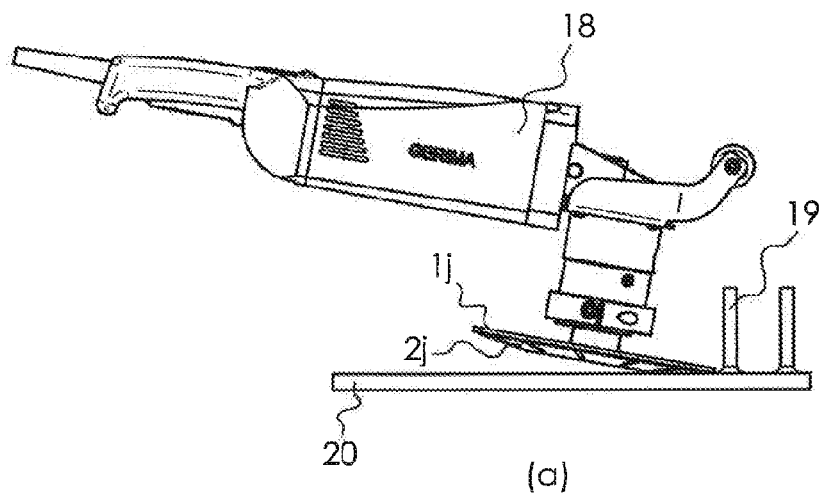
FIGS. 11 to 12 show the grinding and/or cutting tool from FIG. 8 mounted on a grinding machine during machining of a workpiece.
Figure 11:
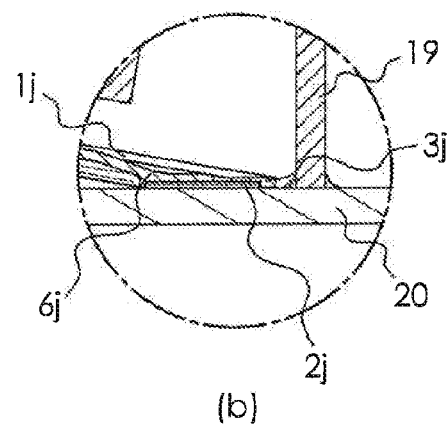
Figure 11:
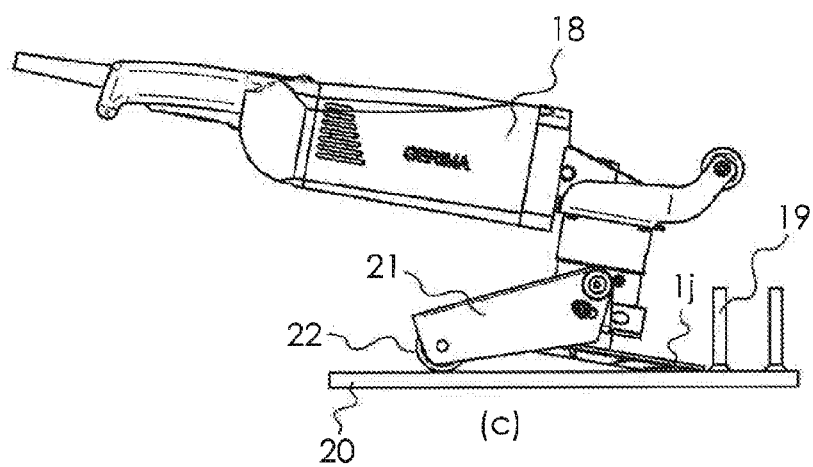

FIG. 11 shows the use of a further grinding and cutting tool 1*j*, which is basically of the same configuration as the grinding tool 1*g* according to FIG. 8 but which, at its edge forming a surface region 3*g* for cutting, has a smaller thickness than the grinding tool 1*g* and is therefore particularly suitable for cutting. The grinding and cutting tool 1*j* is fastened on an angle grinder 18 and is used to cut a bolt 19, which are fastened to a metal plate 20 and protrude from the latter, and to grind the cut surface directly after the cutting work. For this purpose, as is shown in FIG. 11*a*, the grinding machine 18 is held in such a way that a surface region 2*j* for face grinding lies along a line on the metal plate 20 and the grinding and cutting tool 1*j* is guided, under rotation, in the direction of the bolts 19, such that an edge of the grinding and cutting tool 1*j*, which forms a surface region 3*j* for cutting, cuts the bolt 19 from the metal plate 20. By means of the surface region 2*j*, the metal plate can be ground directly thereafter in the cut region.

FIG. 11*c* shows a support bracket 21 that can be fastened to the angle grinder 18. The support bracket 21 has a roller 22 with which the angle grinder can be arranged in a manner stable against tilting when the grinding and cutting tool 1*j* is placed on a substrate. In order to machine the metal plate 20 or the bolts 19, the angle grinder can now be supported on the support bracket and is automatically held, with respect to the metal plate 20, at the angle setting in which the latter is to be ground with the surface region 2*j*.

Figure 12:
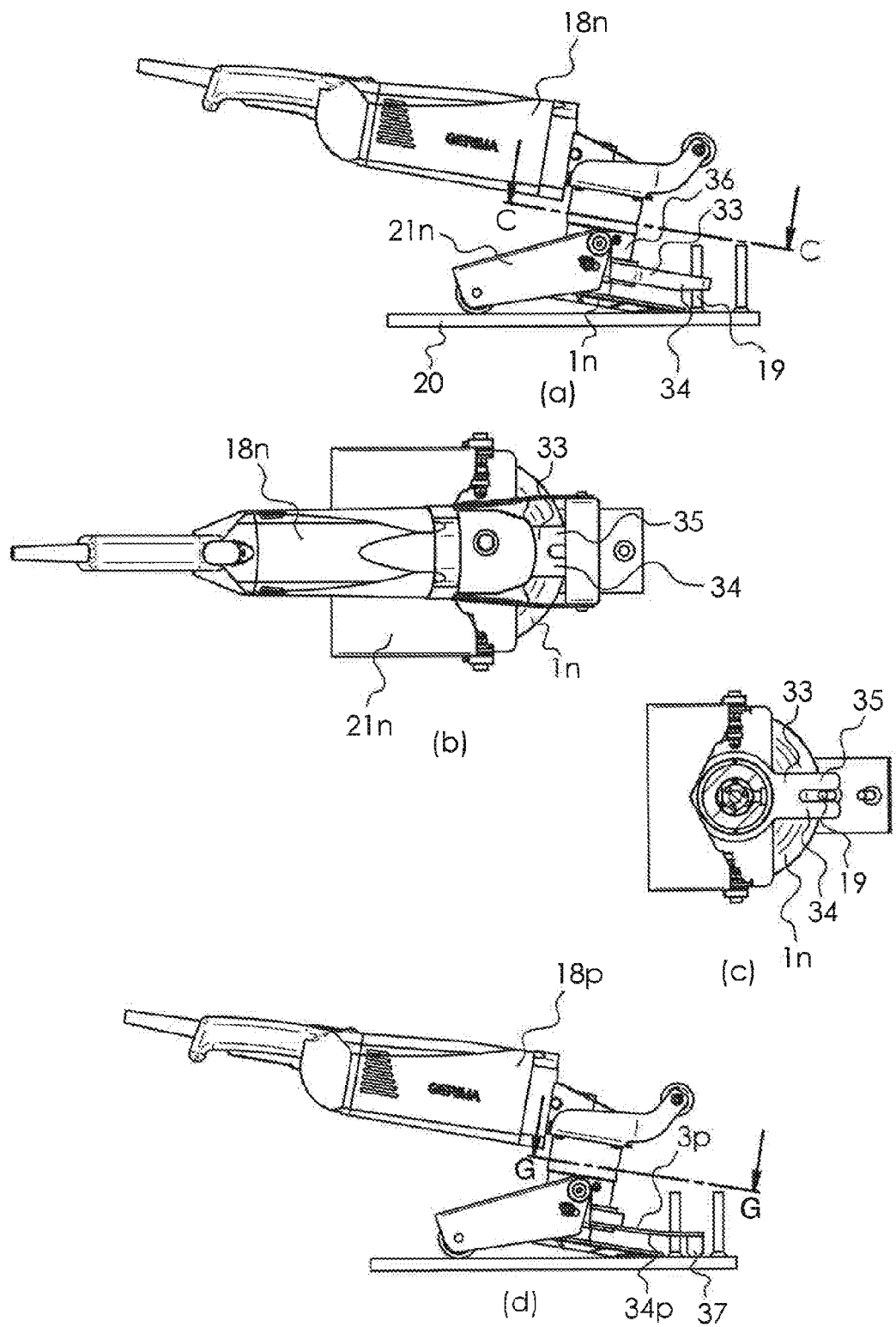

A further combination of a grinding machine 18*n*, which is provided with a grinding and cutting tool 1*n*, and of a support bracket 21*n* is shown in FIG. 12. It differs from the one according to FIG. 11 in that a guide mechanism 33 is arranged on a part 36 of a housing of the grinding machine 18*n*, which guide mechanism 33 comprises two webs 34, 35 arranged at a distance from each other. The webs 34, 35 are arranged at such a distance from each other that the bolt 19 can be pushed in between them. Advantageously, the webs 34, 35 support themselves on the bolt 19 during the cutting off of the bolt 19. In this way, during the cutting of the bolts 19, the grinding machine 18*n* can be much more easily held in the correct position for cutting the bolt 19, preventing it from sliding sideways from the bolt 19 during the cutting work.

In the embodiment of the guide mechanism 33*p* shown in FIG. 12*d*, an attachment 37 is provided at the end of the webs 34*p*, 35*p*, which attachment 37 is supported on the metal plate 20 during the cutting or grinding work and thus forms an additional guide.

Figure 13:
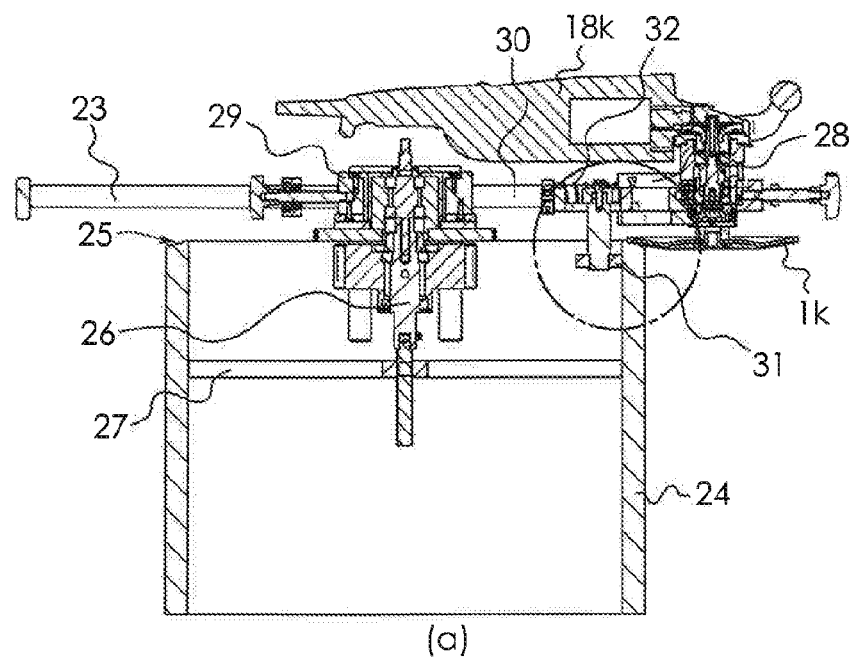
FIG. 13 shows the grinding and/or cutting tool from FIG. 8 mounted on a further grinding machine during machining of a workpiece.
Figure 13:
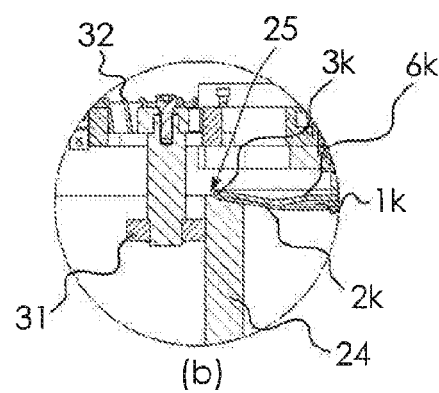
Figure 13:
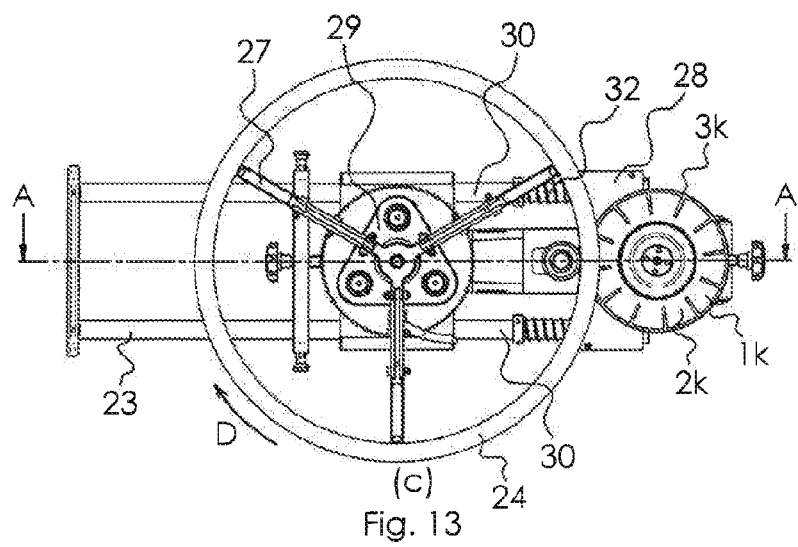

FIG. 13 shows the use of a further grinding tool 1*k*, which is basically of the same configuration as the grinding tool 1*j* according to FIG. 11 and sits on a grinding machine 18*k*. The grinding machine 18*k* is fastened to a holding mechanism 23, which is arranged on a pipe 24 of circular cross section and holds the grinding machine 18k in a position for machining the edge 25.

The holding mechanism 23 comprises a mechanism 26 for fastening it to the pipe 24, which mechanism 26 has three struts 27 which can each comprise a clampable threaded spindle and can be arranged with clamping on the inner side of the pipe 24. A holding unit 28 of the holding mechanism 23, to which the grinding machine 18k is fastened, is connected rotatably to the fastening mechanism 26 via a connection unit 29 that comprises a pivot joint. The holding unit 28 is connected to the connection unit 29 via bars 30 and is displaceable, in the longitudinal direction of the bars 30, with respect to the connection unit 29. The holding unit 28 comprises a roller 31 which bears on the inner side of the pipe 24 and thus secures the position of the grinding machine 18k or of the grinding tool 1k relative to the pipe 24 in the radial direction at the edge 25. The holding unit 28 is pressed away from the connection mechanism 29 in the longitudinal direction of the bars 30 by means of a spring 32, such that the roller 31 at all times bears with stress on the inner wall of the pipe when the entirety of the grinding machine 18k and holding mechanism 23 is arranged on the pipe 24.

In order to machine the edge 25 of the pipe 24, the grinding machine 18, having been fastened to the pipe 24 by means of the holding mechanism 23 as explained above and shown in FIG. 13, is first of all arranged such that it bears with the grinding tool 1k on the region of the edge 24 that is to be machined. The grinding machine 18k is then switched on, and the grinding tool 1k is set in rotation. The grinding machine 18k is now turned around the fastening mechanism 29 and thus around the pipe axis (as shown by the arrow D in FIG. 13) and is thereby moved along the pipe edge 24. The holding unit 28 is pressed by the spring 32 away from the fastening mechanism 26 toward an inner wall of the pipe 24, and the roller 31 is thereby pressed against the inner wall of the pipe. Since the position of the grinding machine 18k is fixed with respect to the roller 31, the grinding tool 1k is at all times in the intended machining position during the movement along the edge 25. The depicted arrangement of the grinding tool 1k is particularly suitable for forming a recess at the pipe edge, for example for forming a so-called tulip shape, which is advantageous for welding the pipe 24.

Since, during the machining of the pipe edge, the grinding tool 1k is subjected to particularly strong mechanical loads in its surface region 3k for circumferential grinding and in the region of the edge between the surface regions 2k and 3k and is also stressed by heating, a main body 6k of the grinding tool 1k that forms the surface region 3k for circumferential grinding has been provided with a particularly wear-resistant abrasive, and a particularly wear-resistant binder has been chosen. In order to form the surface region 2k for face grinding, an abrasive onlay 7k has been chosen that can achieve comparatively greater removal. Compared to the main body 6k, it can have larger abrasive particles. Moreover, the abrasive particles of the abrasive onlay 7k can be bound to a comparatively lesser extent in binder and can thus lie freer at the surface, so as to bring about greater removal of material. On account of the lesser stress, the binder of the abrasive onlay 7k can be provided to be less resistant to wear and therefore more cost-effective.

Figure 26:
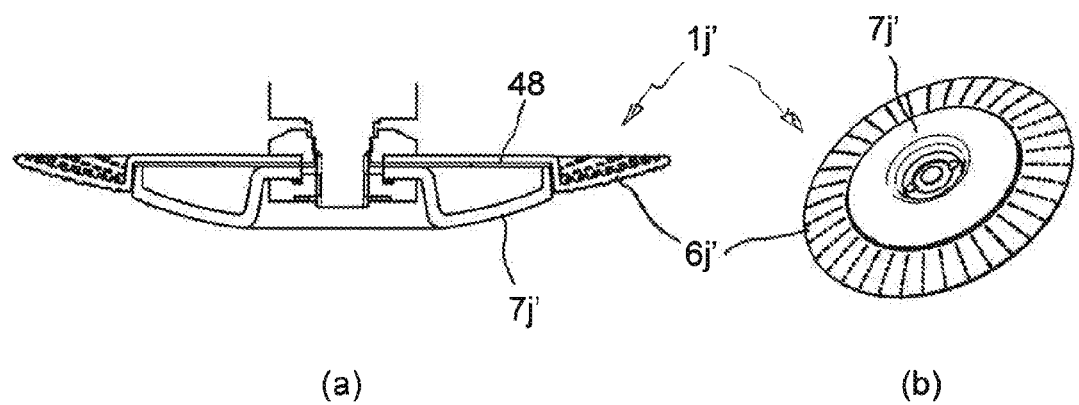
Figure 27:
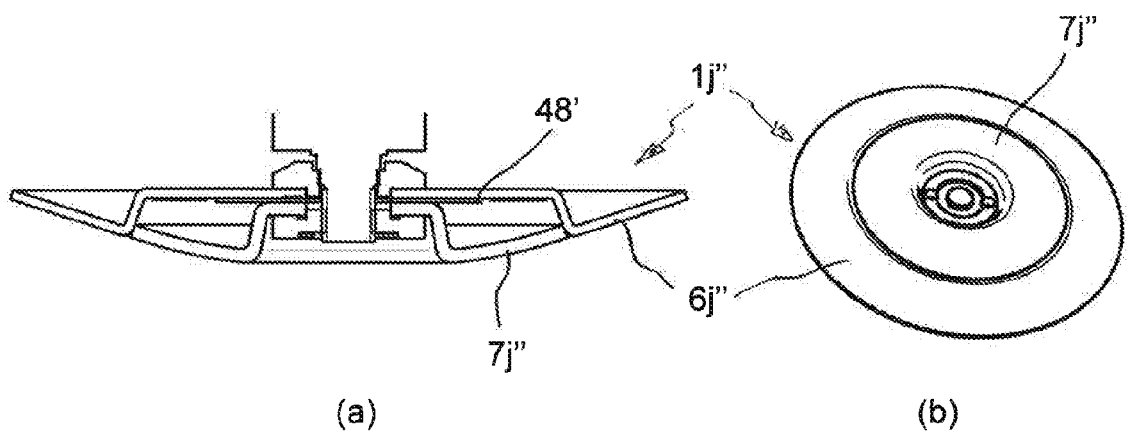

The grinding and cutting tools 1j', 1j''' shown in cross section in FIGS. 26 and 27 are also suitable in particular for the uses shown in FIGS. 11 to 13. The grinding and cutting tool 1j' from FIG. 26 has, as main body 6j', a diamond cutting disk, while the grinding and cutting tool 1j''' from FIG. 26 has, as main body 6j''', a resin-bonded cutting disk. The main body 6j', 6j''' has a pot-shaped inner portion into which an abrasive body 7j', 7j''' can be inserted. A disk 48, 48' is arranged as spacer between the main body 6j', 6j''' and the abrasive body 7j', 7j'''. Through the use of spacer disks 48, 48' of different thickness, the position of the abrasive bodies 7j', 7j''' in relation to the main body 6j', 6j''' can be changed.

Figure 14:
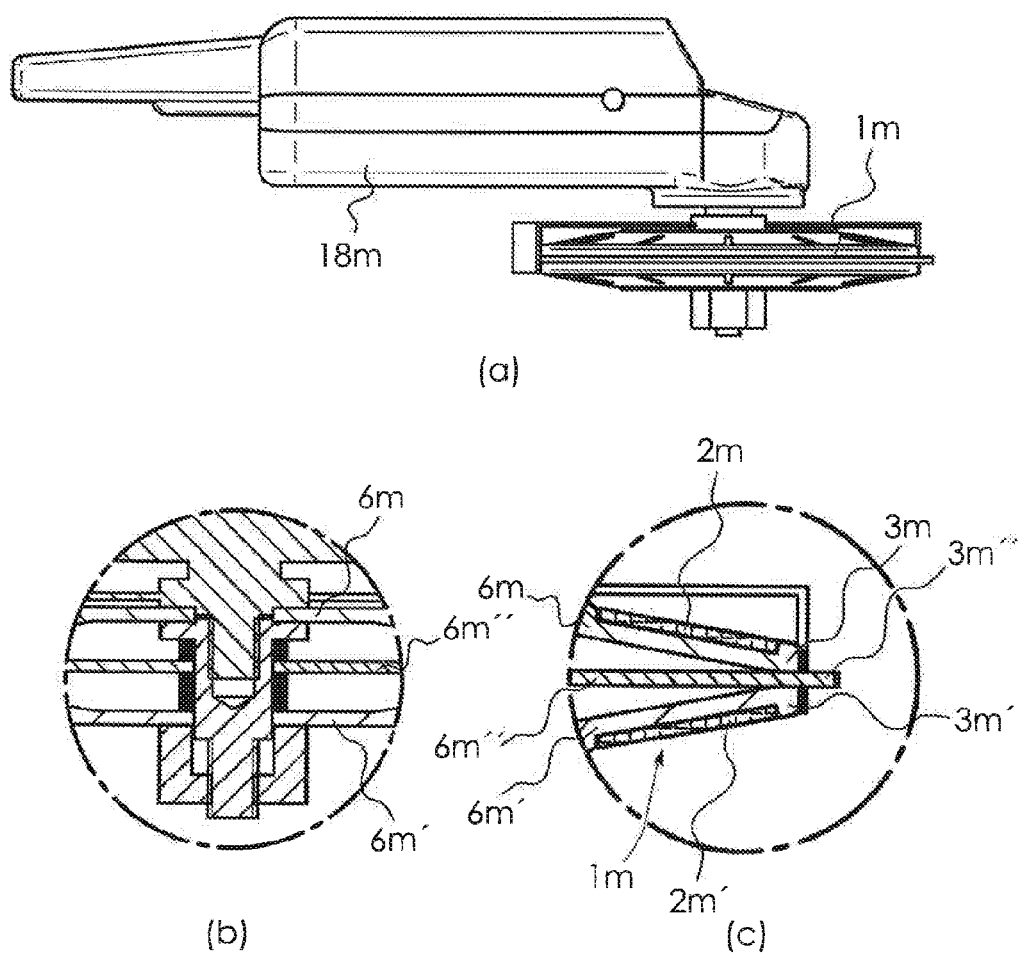
FIG. 14 shows a further grinding and/or cutting tool according to the invention mounted on a grinding machine.

A grinding and cutting tool 1m, shown in FIG. 14, differs from the grinding and/or cutting tools explained above particularly in that its edge both has two surface regions 3m, 3m' for circumferential grinding and also a surface region 3m''' for cutting. As has been explained above for the other grinding and/or cutting tools, the surface regions 3m, 3m' are each formed on respective main bodies 6m, 6m', which have a substance combination of a binder with added abrasive. A cutting disk 6m''', likewise formed from a combination of binder and abrasive, is arranged between the main bodies 6m, 6m' and has a greater diameter than the main bodies 6m, 6m' and therefore also protrudes outward.

An advantageous use of the grinding and cutting tool 1m is that a workpiece can first of all be cut by means of the surface region 3m''', and then an edge formed by the cutting process can be machined directly by circumferential grinding by means of the surface regions 3m, 3m' or the surface regions 2m, 2m' for face grinding. Such a use is suitable in particular for the machining of pipes.

Figure 25:
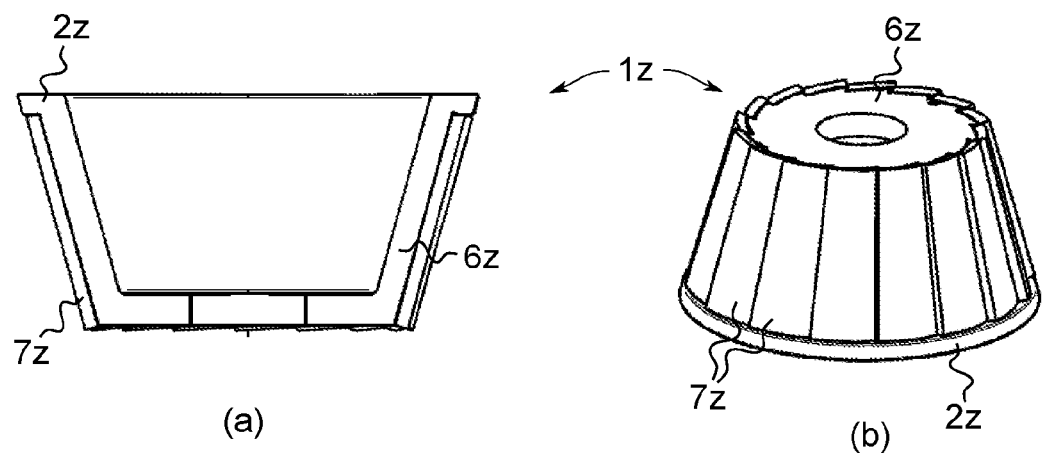

FIG. 25 shows a further grinding tool 1z according to the invention, having a main body 6z with a conical shape. Steps ascending in the circumferential direction are formed on a lateral surface of the main body 6z. A respective abrasive onlay 7z is bonded to each of the steps. At a lower edge of the main body 6z, a circumferential web 2z is formed, of which the underside can be used as a grinding surface for face grinding.

In a further illustrative embodiment, not shown here, the main body 6z according to FIG. 25 has a cylindrical shape instead of a conical one.

In a further embodiment of the invention, not shown here, a grinding tool has the same outer shape as the grinding tool 1z from FIG. 25 or has a cylindrical shape, but is provided with a support body which carries the abrasive onlays 7z and is connected releasably to a main body to which the support body can be fastened. The main body is formed and shaped from such a material that its lower side can be used as a grinding surface for face grinding. Advantageously, the support body or the main body can be replaced if it becomes worn.

The surface regions of the above-described grinding and/or cutting tools can differ from one another in terms of their removal properties, particularly by the fact that they have different material properties. The different material properties can be provided by the fact that the surface regions have different abrasives. The abrasives can differ in terms of the substances of the abrasive particles, e.g. corundum, quartz, pumice, diamond, silicon carbide and/or cubic boron nitride. Moreover, the surface regions can differ from one another in terms of different abrasive particle shapes and sizes, particle scatter, granules, hardness, structure, porosity, strengthening materials (fibers, in particular glass or carbon fibers), support materials and/or binders.

The invention claimed is:

1. A grinding and/or cutting tool, comprising: at least one surface region for face grinding; and a surface region for circumferential grinding and/or cutting; and, a face grinder body, which comprises the at least one surface region for face grinding, and a main body formed as a grinder and/or cutter in the surface region for circumferential grinding and/or cutting, which has an opening for attaching the grinding and/or cutting tool to a shaft of a grinding machine, wherein the main body is provided with an abrasive at least in the surface region for circumferential grinding and/or cutting, wherein the at least one surface region for face grinding and the surface region for circumferential grinding and/or cutting have removal properties differing from one another, wherein the removal properties differ in that the surface regions have different abrasives having abrasive particles, wherein the abrasive particles in the regions have the removal properties, wherein the abrasives differ in terms of substances of the abrasive particles, abrasive particle shapes and sizes, particle scatter, granules, hardness, structure, porosity, strengthening materials, support materials and/or binder, wherein the face grinder body is releasably fastened to the main body by screwing or clamping so that the face grinder body is detachable from the grinding and/or cutting tool, wherein the at least one surface region for face grinding is formed by an abrasive onlay that is arranged on the face grinder body and is connected thereto, and wherein the face grinder body has at least one recess into which the abrasive onlay is placeable.

2. The grinding and/or cutting tool according to claim 1, wherein the surface region for circumferential grinding and/or cutting and the at least one surface region for face grinding have different shapes and/or different material properties.

3. The grinding and/or cutting tool according to claim 1, wherein the surface region for circumferential grinding and/or cutting is at a radially outer edge of the grinding and/or cutting tool, wherein the surface region for circumferential grinding and/or cutting terminates the grinding and/or cutting tool radially outwardly.

4. The grinding and/or cutting tool according to claim 1, wherein the surface region for circumferential grinding and/or cutting is at least in part shaped as a lateral surface having a shape of at least one of a right circular cylinder, cone and curved shape.

5. The grinding and/or cutting tool according to claim 4, wherein the surface region for circumferential grinding and/or cutting has at least in part the shape of a lateral surface of a cone and an angle between surface lines of the surface region for circumferential grinding and/or cutting and an axis of symmetry of the lateral surface that is <3°.

6. The grinding and/or cutting tool according to claim 5, wherein the angle is <2°.

7. The grinding and/or cutting tool according to claim 1, wherein the abrasive onlay is an abrasive sheet, an abrasive paper, an abrasive band or an abrasive film.

8. The grinding and/or cutting tool according to claim 1, wherein the recess is arranged at a distance from the surface region for circumferential grinding and/or cutting.

9. The grinding and/or cutting tool according to claim 1, wherein the at least one surface region for face grinding is shaped as a base of a circular cylinder or a lateral surface of a cone or a curved shape.

10. The grinding and/or cutting tool according to claim 9, wherein the at least one surface region for face grinding has a convexly curved shape.

11. The grinding and/or cutting tool according to claim 9, wherein the at least one surface region for face grinding is shaped as a lateral surface of a cone and has an angle between surface lines of the at least one surface region for face grinding and an axis of symmetry of the lateral surface that is >60°.

12. The grinding and/or cutting tool according to claim 11, wherein the angle is >65°.

* * * * *